United States Patent
Imanaka et al.

(10) Patent No.: US 7,070,859 B2
(45) Date of Patent: Jul. 4, 2006

(54) ACRYLIC RESIN COMPOSITION ORGANOSILOXANE RESIN COMPOSITION AND LAMINATE COMPRISING THE SAME

(75) Inventors: Yoshihiko Imanaka, Chiyoda-ku (JP); Shunsuke Kajiwara, Chiyoda-ku (JP); Tatsuya Ekinaka, Chiyoda-ku (JP); Toshio Kita, Chiyoda-ku (JP); Takehiro Suga, Chiyoda-ku (JP); Ryou Niimi, Chiyoda-ku (JP); Isao Sogou, Chiyoda-ku (JP)

(73) Assignee: Teijin Chemicals, Ltd., Tokyo (JP)

( * ) Notice: Subject to any disclaimer, the term of this patent is extended or adjusted under 35 U.S.C. 154(b) by 0 days.

(21) Appl. No.: 10/487,218

(22) PCT Filed: Jun. 20, 2003

(86) PCT No.: PCT/JP03/07883

§ 371 (c)(1),
(2), (4) Date: Feb. 19, 2004

(87) PCT Pub. No.: WO04/000551

PCT Pub. Date: Dec. 31, 2003

(65) Prior Publication Data

US 2004/0247878 A1    Dec. 9, 2004

(30) Foreign Application Priority Data

Jun. 21, 2002  (JP)  ............................. 2002-181142
Jun. 25, 2002  (JP)  ............................. 2002-184229
Jun. 27, 2002  (JP)  ............................. 2002-187969

(51) Int. Cl.
    B32B 2/36        (2006.01)
(52) U.S. Cl. ..................... 428/412; 359/642; 428/142; 428/411.1
(58) Field of Classification Search ................ 359/642; 428/142, 411.1, 412
See application file for complete search history.

(56) References Cited

U.S. PATENT DOCUMENTS

| | | | |
|---|---|---|---|
| 3,986,997 A | 10/1976 | Clark | |
| 4,309,319 A | 1/1982 | Vaughn, Jr. | |
| 4,725,459 A | 2/1988 | Kimura et al. | |
| 6,294,313 B1 * | 9/2001 | Kobayashi et al. | 430/302 |
| 6,770,352 B1 * | 8/2004 | Suzuki et al. | 428/142 |
| 6,808,804 B1 * | 10/2004 | Hotaka et al. | 428/357 |

FOREIGN PATENT DOCUMENTS

| | | |
|---|---|---|
| JP | 51-2736 | 1/1976 |
| JP | 55-94971 | 7/1980 |
| JP | 56-161871 | 12/1981 |
| JP | 60-219234 | 11/1985 |
| JP | 62-169832 | 7/1987 |
| JP | 63-278979 | 11/1988 |
| JP | 01-306476 | 12/1989 |
| JP | 2000-318106 | 11/2000 |
| JP | 2002-338719 | 11/2002 |

\* cited by examiner

Primary Examiner—Terressa Boykin
(74) Attorney, Agent, or Firm—Wenderoth, Lind & Ponack, L.L.P.

(57) ABSTRACT

A laminate which is excellent in appearance, adhesion, scratch resistance, abrasion resistance and hot water resistance and has a high level of weatherability and excellent durability, and an acrylic resin composition and an organosiloxane resin composition both of which can be used for the manufacture of the above laminate and have excellent storage stability.

The laminate comprises a polycarbonate substrate, a first layer formed on the surface of the polycarbonate substrate, and a second layer formed on the surface of the first layer, wherein the first layer is composed of a crosslinked acrylic copolymer and an ultraviolet light absorber, and the second layer is composed of a crosslinked organosiloxane polymer; and the crosslinked acrylic copolymer comprises specific recurring units and an urethane bond in a specific ratio, and the organosiloxane polymer has a specific structure composed of colloidal silica and alkoxysilanes.

14 Claims, No Drawings

ACRYLIC RESIN COMPOSITION ORGANOSILOXANE RESIN COMPOSITION AND LAMINATE COMPRISING THE SAME

This application is a U.S. national stage of International Application No. PCT/JP03/07883 filed Jun. 20, 2003.

TECHNICAL FIELD

The present invention relates to a laminate comprising a polycarbonate substrate, a first layer and a second layer. More specifically, it relates to a laminate which comprises a polycarbonate substrate, a first layer composed of a crosslinked acrylic copolymer and a second layer composed of an organosiloxane polymer and which has excellent weatherability, abrasion resistance and durability. The present invention also relates to an acrylic resin composition used in the first layer of the laminate and an organosiloxane resin composition used in the second layer.

BACKGROUND ART

Polycarbonate resins are used in a variety of fields, making use of their impact resistance, transparency, light weight and workability. Particularly, they are used as glass substitutes, making use of their transparency. However, it is known that they are unsatisfactory in terms of weatherability and decompose or deteriorate when they are used outdoors for a long time with the result that their physical properties and appearances are impaired. The surfaces of the polycarbonate resins are readily scratched due to low abrasion resistance and also easily corroded by a solvent.

A trend toward the use of a polycarbonate as organic glass for windows, particularly car windows, making use of their light weight and safety can be seen recently. When a polycarbonate sheet is used for this purpose, weatherability as high as that of glass is required.

Front glass must be protected from scratches by the operation of a wiper and a side window also must be protected from scratches when the window moves vertically. Thus, a high level of abrasion resistance is required for these glasses.

Further, the sunroof is expected to become very hot under a burning sun in the middle of summer. A polycarbonate molded product used for this purpose requires higher durability against environmental variations and a high temperature environment.

To improve these defects, there have been made a large number of proposals for a laminate which comprises a thermosetting acrylic resin layer formed on the surface of a polycarbonate substrate and a siloxane-based cured film formed on the resin layer to improve weatherability, durability and abrasion resistance.

For instance, the inventors of the present invention have proposed the addition of an ultraviolet light absorber having a specific structure to a thermosetting acrylic resin layer in order to improve weatherability (patent document 1). However, weatherability high enough to enable long-term outdoor use still cannot be achieved.

The improvement of durability against environmental variations is proposed (patent document 2). However, due to the low storage stability of a coating, the viscosity of the coating increases during storage or use, thereby making it impossible to use it stably. Further, a molded product having stable physical properties of a coating film cannot be obtained because a side-reaction readily occurs during thermal curing due to the high reactivity of an isocyanate group.

Meanwhile, there is proposed a coating composition which comprises a trihydroxysilane partial condensate and colloidal silica to improve abrasion resistance (patent documents 3 and 4). There is also proposed a coating composition essentially consisting of a partial condensate of an alkyltrialkoxysilane and a tetraalkoxysilane (patent documents 5 and 6).

There is further proposed a coating composition prepared by adding colloidal silica to a condensate of an alkyltrialkoxysilane and a tetraalkoxysilane (patent documents 7 and 8).

However, laminates comprising a cured film obtained from any one of the above coating compositions on a polycarbonate substrate have a certain measure of abrasion resistance but are unsatisfactory in terms of durability against environmental variations and a high temperature environment.

In the above laminates, the coating layer may crack as a thermally cured layer of an organosiloxane resin is pulled under a high temperature environment due to a difference in thermal expansion coefficient between the polycarbonate substrate and the thermally cured layer of an organosiloxane resin.

(patent document 1) JP-A 2000-318106 (the term "JP-A" as used herein means an "unexamined published Japanese patent application")

(patent document 2) JP-A 62-169832

(patent document 3) JP-A 51-2736

(patent document 4) JP-A 55-94971

(patent document 5) JP-A 48-26822

(patent document 6) JP-A 51-33128

(patent document 7) JP-A 63-278979

(patent document 8) JP-A 1-306476

It is an object of the present invention to provide a laminate which has excellent weatherability, durability, abrasion resistance and hot water resistance and which comprises a polycarbonate substrate.

It is another object of the present invention to provide an acrylic resin composition and an organosiloxane resin composition having excellent storage stability, for forming layers on a polycarbonate substrate.

The inventors of the present invention have conducted intensive studies to attain these objects and have found that a laminate which is provided with high levels of weatherability and abrasion resistance and has sufficiently high durability against environmental variations and a high temperature environment and whose surface is protected by a cured film can be obtained by forming a first layer essentially composed of a thermosetting acrylic resin having specific composition on the surface of the polycarbonate substrate and a second layer obtained by thermosetting an organosiloxane resin comprising colloidal silica and a hydrolysis and condensation product of a trialkoxysilane in the mentioned order. The present invention has been accomplished based on this finding.

DISCLOSURE OF THE INVENTION

That is, according to a first aspect of the present invention, there is provided a laminate which comprises a polycarbonate substrate, a first layer formed on the surface of the polycarbonate substrate, and a second layer formed on the surface of the first layer, wherein the first layer comprises a crosslinked acrylic copolymer and an ultraviolet light absorber and the second layer comprises a crosslinked organosiloxane polymer;

the crosslinked acrylic copolymer comprises 50 mol % or more of a recurring unit represented by the following formula (A-1):

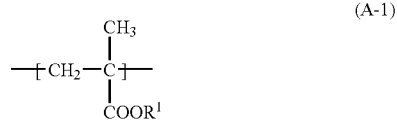
(A-1)

wherein $R^1$ is a methyl group or ethyl group, 5 to 30 mol % of a recurring unit represented by the following formula (A-2):

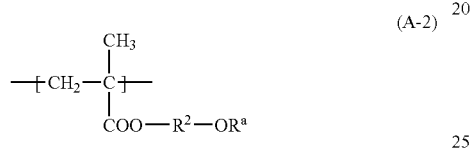
(A-2)

wherein $R^2$ is an alkylene group having 2 to 5 carbon atoms, at least some of $R^a$'s in the recurring units of the formula (A-2) are single bonds and the others are hydrogen atoms, and when $R^a$ is a single bond, it is bonded to other recurring unit represented by the formula (A-2) through an urethane bond, and 0 to 30 mol % of a recurring unit represented by the following formula (A-3):

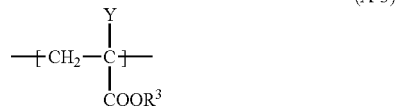
(A-3)

wherein Y is a hydrogen atom or methyl group, and $R^3$ is at least one group selected from the group consisting of hydrogen atom, alkyl group having 2 to 5 carbon atoms and ultraviolet light absorbing residue, with the proviso that a case where Y is a methyl group and $R^3$ is a methyl group or ethyl group is excluded, the molar ratio of the urethane bond to the total of the recurring units represented by the formulas (A-1) to (A-3) being 4/100 to 30/100; and the crosslinked organosiloxane polymer comprises recurring units represented by the following formulas (b-4), (b-5) and (b-6):

(b-4)

(b-5)

(b-6)

wherein $Q^1$ and $Q^2$ are each an alkyl group having 1 to 4 carbon atoms, vinyl group or alkyl group having 1 to 3 carbon atoms substituted by at least one group selected from the group consisting of methacryloxy group, amino group, glycidoxy group and 3,4-epoxycyclohexyl group, the (b-4)/(b-5)/(b-6) molar ratio of the recurring units being 80-100/0-20/0-20.

Preferably, the crosslinked acrylic copolymer comprises 70 to 95 mol % of the recurring unit represented by the formula (A-1) and 5 to 30 mol % of the recurring unit represented by the formula (A-2).

Preferably, $R^1$ in the formula (A-1) is an ethyl group and $R^2$ in the formula (A-2) is an ethylene group in the crosslinked acrylic copolymer.

Preferably, the thickness of the polycarbonate substrate is 1 to 10 mm, the thickness of the first layer is 1 to 12 μm, and the thickness of the second layer is 2 to 10 μm.

Preferably, the first layer contains an ultraviolet light absorber having an absorbance of 0.25 or more at a wavelength of 300 nm when measured in a chloroform solution having a concentration of 10 mg/L at an optical path length of 1.0 cm and satisfies the following expressions (i) to (iii):

$$2 \leq d \leq 8 \quad (i)$$

$$0.1 \leq c \leq 0.5 \quad (ii)$$

$$0.6 \leq d \times c \leq 3 \quad (iii)$$

wherein d is the thickness (μm) of the first layer and c is the concentration (g/cm³) of the ultraviolet light absorber in the first layer.

According to a second aspect of the present invention, there is provided a laminate which comprises a polycarbonate substrate, a first layer formed on the surface of the polycarbonate substrate, and a second layer formed on the surface of the first layer, wherein the first layer is formed by applying an acrylic resin composition comprising components (A) to (E) to the surface of the polycarbonate substrate and curing it, and the second layer is formed by applying an organosiloxane resin composition comprising components (a) to (d) to the surface of the first layer and curing it;

the component (A) is an acrylic copolymer which comprises 50 mol % or more of a recurring unit represented by the following formula (A-1):

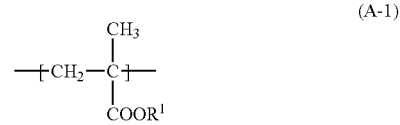
(A-1)

wherein $R^1$ is a methyl group or ethyl group, 5 to 30 mol % of a recurring unit represented by the following formula (A-4):

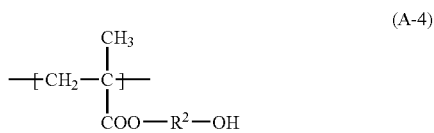
(A-4)

wherein $R^2$ is an alkylene group having 2 to 5 carbon atoms, and 0 to 30 mol % of a recurring unit represented by the following formula (A-3):

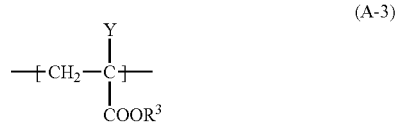

wherein Y is a hydrogen atom or methyl group, R³ is at least one group selected from the group consisting of hydrogen atom, alkyl group having 2 to 5 carbon atoms and ultraviolet light absorbing residue, with the proviso that a case where Y is a methyl group and R³ is a methyl group or ethyl group is excluded;

the component (B) is a polyisocyanate compound and/or a blocked polyisocyanate compound having an isocyanate group content of 0.7 to 5 equivalents based on 1 equivalent of the hydroxy group of the component (A);

the component (C) is a curing catalyst which is contained in an amount of 0 to 0.4 part by weight based on 100 parts by weight of the total of the components (A) and (B);

the component (D) is an ultraviolet light absorber which is contained in an amount of 10 to 50 parts by weight based on 100 parts by weight of the total of the component (A) and (B);

the component (E) is a silane coupling agent which is contained in an amount of 0 to 5 parts by weight based on 100 parts by weight of the total of the components (A) and (B);

the component (a) is colloidal silica;

the component (b) is a hydrolysate(s) and/or condensate(s) of alkoxysilanes represented by the following formulas (b-1) to (b-3);

wherein $Q^1$ and $Q^2$ are each an alkyl group having 1 to 4 carbon atoms, vinyl group or alkyl group having 1 to 3 carbon atoms substituted by at least one group selected from the group consisting of methacryloxy group, amino group, glycidoxy group and 3,4-epoxycyclohexyl group, and $Q^3$ is an alkyl group having 1 to 4 carbon atoms, the (b-1)/(b-2)/(b-3) molar ratio of the above components being 80-100/0-20/0-20;

the component (c) is a curing catalyst;

the component (d) is a solvent; and the molar ratio of Si derived from the component (a) to Si derived from the component (b) ($Si^a/Si^b$) is 2/8 to 4/6.

Preferably, the component (B) is a blocked polyisocyanate compound.

Preferably, the component (C) is an organic tin compound represented by the following formula and contained in an amount of 0.01 to 0.4 part by weight based on 100 parts by weight of the total of the components (A) and (B):

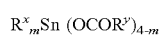

wherein $R^x$'s may be the same or different and each a hydrocarbon group having 1 to 8 carbon atoms, $R^y$'s may be the same or different and each a substituted or nonsubstituted hydrocarbon group having 1 to 17 carbon atoms, and m is an integer of 0 to 3.

Preferably, the component (A) is an acrylic copolymer which comprises 70 to 95 mol % of the recurring unit represented by the formula (A-1) and 5 to 30 mol % of the recurring unit represented by the formula (A-4).

Preferably, $R^1$ in the formula (A-1) is an ethyl group and $R^2$ in the formula (A-4) is an ethylene group in the component (A).

According to a third aspect of the present invention, there is provided an acrylic resin composition which comprises components (A) to (E), wherein the component (A) is an acrylic copolymer which comprises 50 mol % or more of a recurring unit represented by the following formula (A-1):

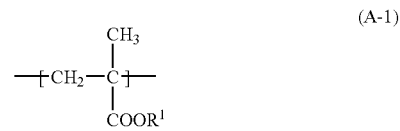

wherein $R^1$ is a methyl group or ethyl group, 5 to 30 mol % of a recurring unit represented by the following formula (A-4):

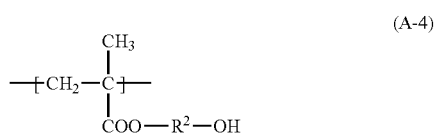

wherein $R^2$ is an alkylene group having 2 to 5 carbon atoms, and 0 to 30 mol % of a recurring unit represented by the following formula (A-3):

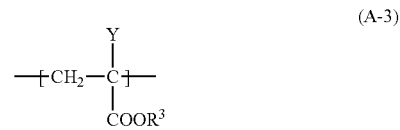

wherein Y is a hydrogen atom or methyl group, and R³ is at least one group selected from the group consisting of hydrogen atom, alkyl group having 2 to 5 carbon atoms and ultraviolet light absorbing residue, with the proviso that a case where Y is a methyl group and R³ is a methyl group or ethyl group is excluded;

the component (B) is a polyisocyanate compound and/or a blocked polyisocyanate compound having an isocyanate group content of 0.7 to 5 equivalents based on 1 equivalent of the hydroxy group of the component (A);

the component (C) is a curing catalyst which is contained in an amount of 0 to 0.4 part by weight based on 100 parts by weight of the total of the components (A) and (B);

the component (D) is an ultraviolet light absorber which is contained in an amount of 10 to 50 parts by weight based on 100 parts by weight of the total of the components (A) and (B); and the component (E) is a silane coupling agent which is contained in an amount of 0 to 5 parts by weight based on 100 parts by weight of the total of the components (A) and (B).

Preferably, the component (B) is a blocked polyisocyanate compound.

Preferably, the component (C) is an organic tin compound and contained in an amount of 0.01 to 0.4 part by weight based on 100 parts by weight of the total of the components (A) and (B).

Preferably, the component (A) is an acrylic copolymer which comprises 70 to 95 mol % of the recurring unit represented by the formula (A-1) and 5 to 30 mol % of the recurring unit represented by the formula (A-4).

Preferably, $R^1$ in the formula (A-1) is an ethyl group and $R^2$ in the formula (A-4) is an ethylene group in the component (A).

Preferably, the component (C) is an organic tin compound represented by the following formula:

$$R^x{}_m Sn(OCOR^y)_{4-m}$$

wherein $R^x$'s may be the same or different and each a hydrocarbon group having 1 to 8 carbon atoms, $R^y$'s may be the same or different and each a substituted or nonsubstituted hydrocarbon group having 1 to 17 carbon atoms, and m is an integer of 0 to 3.

According to a fourth aspect of the present invention, there is provided an organosiloxane resin composition which comprises components (a) to (d), wherein the component (a) is colloidal silica;

the component (b) is a hydrolysate(s) and/or condensate(s) of alkoxysilanes represented by the following formulas (b-1) to (b-3):

$$Q^1Si(OQ^3)_3 \quad (b-1)$$

$$Q^1Q^2Si(OQ^3)_2 \quad (b-2)$$

$$Si(OQ^3)_4 \quad (b-3)$$

wherein $Q^1$ and $Q^2$ are each an alkyl group having 1 to 4 carbon atoms, vinyl group or alkyl group having 1 to 3 carbon atoms substituted by at least one group selected from the group consisting of methacryloxy group, amino group, glycidoxy group and 3,4-epoxycyclohexyl group, and $Q^3$ is an alkyl group having 1 to 4 carbon atoms, the (b-1)/(b-2)/(b-3) ratio of the above components being 80-100/0-20/0-20;

the component (c) is a curing catalyst;

the component (d) is a solvent; and the molar ratio of Si derived from the component (a) to Si derived from the component (b) in the resin composition ($Si^a/Si^b$) is 2/8 to 4/6.

Preferably, when the silicon nuclear magnetic resonance spectrum ($^{29}$Si-NMR) of the organosiloxane resin composition was measured using deuterium oxide ($D_2O$) as a measurement solvent at a measurement frequency of 79 MHz, a measurement pulse of 6.0 μs, a repetition time of 30 sec. and a broadening factor of 5 Hz, the chemical shifts of the silicon atoms of the organosiloxane resin composition satisfy the following expressions:

$$0.002 \leq [X]/[S] \leq 0.2 \text{ and } 0.6 \leq [Y]/[Z] \leq 3$$

wherein [S] is the integrated value of all the peaks at a range from −46.5 ppm to −70.0 ppm, [X] is the integrated value of all the peaks at a range from −46.5 ppm to −48.5 ppm, [Y] is the integrated value of all the peaks at a range from −52.5 ppm to −61.0 ppm, and [Z] is the integrated value of all the peaks at a range from −61.0 ppm to −70.0 ppm when the peak of the silicon atom of tetramethylsilane is at 0 ppm.

Preferably, the organosiloxane resin composition further comprises as a component (e) an acrylic copolymer which comprises 50 to 90 mol % of a recurring unit represented by the following formula (A-1):

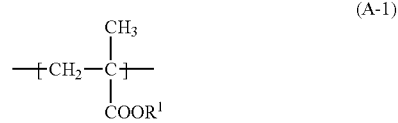

(A-1)

wherein $R^1$ is a methyl group or ethyl group, and 10 to 50 mol % of a recurring unit represented by the following formula (A-4):

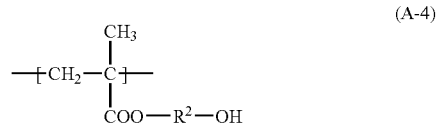

(A-4)

wherein $R^2$ is an alkylene group having 2 to 5 carbon atoms, in an amount of 0.1 to 20 parts by weight based on 100 parts by weight of the organosiloxane resin composition.

BEST MODE FOR CARRYING OUT THE INVENTION

<Laminate>

According to the first aspect of the present invention, there is provided a laminate which comprises a polycarbonate substrate, a first layer formed on the surface of the polycarbonate substrate and a second layer formed on the surface of the first layer.

<Polycarbonate Substrate>

The polycarbonate substrate used in the present invention is made of a polycarbonate resin which is obtained by reacting a diphenol with a carbonate precursor in accordance with an interfacial polycondensation process or melting process.

Typical examples of the diphenol include
2,2-bis(4-hydroxyphenyl)propane (commonly called "bisphenol A"), 2,2-bis(3-methyl-4-hydroxyphenyl)propane,
2,2-bis(3,5-dimethyl-4-hydroxyphenyl)propane,
1,1-bis(4-hydroxyphenyl)ethane,
1,1-bis(4-hydroxyphenyl)cyclohexane,
2,2-bis(4-hydroxyphenyl)butane,
2,2-bis(4-hydroxyphenyl)-3-methylbutane,
9,9-bis(4-hydroxy-3-methyl)phenylfluorene,
2,2-bis(4-hydroxyphenyl)-3,3-dimethylbutane,
2,2-bis(4-hydroxyphenyl)-4-methylpentane,
1,1-bis(4-hydroxyphenyl)-3,3,5-trimethylcyclohexane,
α,α'-bis(4-hydroxyphenyl)-m-diisopropylbenzene,
bis (4-hydroxyphenyl) sulfide and bis (4-hydroxyphenyl) sulfone.

Out of these, bisphenol A is preferred. These diphenols may be used alone or in combination of two or more.

As the carbonate precursor is used a carbonyl halide, carbonate ester or haloformate such as phosgene, diphenyl carbonate or dihaloformate of a diphenol.

To obtain a polycarbonate resin by reacting the above diphenol with the carbonate precursor in accordance with an interfacial polycondensation process or melting process, a catalyst, terminal capping agent and antioxidant for the diphenol may be optionally used. The polycarbonate resin may be a branched polycarbonate resin obtained by copolymerizing a polyfunctional aromatic compound having a functionality of 3 or more, polyester carbonate resin obtained by copolymerizing an aromatic or aliphatic difunctional carboxylic acid, or a mixture of two or more polycarbonate resins.

In the interfacial polycondensation process using phosgene, a reaction is carried out in the presence of an acid binder and an organic solvent. Examples of the acid binder include alkali metal hydroxides such as sodium hydroxide and potassium hydroxide; and amine compounds such as pyridine. Examples of the solvent include halogenated hydrocarbons such as methylene chloride and chlorobenzene. A catalyst such as a tertiary amine or quaternary ammonium salt may be used to promote the reaction. The reaction temperature is generally 0 to 40° C., and the reaction time is several minutes to 5 hours.

In the melting process using diphenyl carbonate, a diphenol component and diphenyl carbonate in a predetermined ratio are stirred under heating in an inert gas atmosphere, and the formed alcohol or phenol is distilled off. The reaction temperature which differs according to the boiling point of the formed alcohol or phenol is generally 120 to 300° C. The reaction is completed while the formed alcohol or phenol is distilled off by reducing the pressure from the beginning. An ordinary transesterification reaction catalyst may also be used to promote the reaction.

The molecular weight of the polycarbonate resin is preferably 10,000 to 50,000, more preferably 15,000 to 35,000 in terms of viscosity average molecular weight (M). The polycarbonate resin having the above viscosity average molecular weight has sufficiently high strength and excellent melt fluidity at the time of molding. The viscosity average molecular weight as in the present invention is obtained by dissolving 0.7 g of the polycarbonate resin in 100 ml of methylene chloride at 20° C. and inserting a specific viscosity ($\eta sp$) obtained from the solution into the following expression.

$\eta sp/c = [\eta] + 0.45 \times [\eta]^2 c$ $[\eta] = 1.23 \times 10^{-4} M^{0.83}$ (c=0.7, $[\eta]$ is an intrinsic viscosity)

For the production of the polycarbonate resin, a stabilizer such as phosphate, phosphate or phosphonate, flame retardant such as tetrabromobisphenol A, low molecular weight polycarbonate prepared from tetrabromobisphenol A or decabromodiphenol, colorant and lubricant may be optionally added.

Preferably, the polycarbonate substrate has a haze value of 10% or less. The thickness of the substrate is 1 to 10 mm, preferably 2 to 8 mm.

<First Layer>

The first layer is composed of a crosslinked acrylic copolymer and an ultraviolet light absorber.

The crosslinked acrylic copolymer comprises 50 mol % or more of a recurring unit represented by the following formula (A-1):

wherein $R^1$ is a methyl group or ethyl group, 5 to 30 mol % of a recurring unit represented by the following formula (A-2):

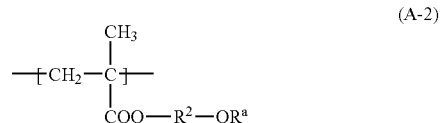

wherein $R^2$ is an alkylene group having 2 to 5 carbon atoms, at least some of $R^a$'s in the recurring units of the formula (A-2) are single bonds and the others are hydrogen atoms, and when $R^a$ is a single bond, it is bonded to other recurring unit represented by the formula (A-2) by an urethane bond, and 0 to 30 mol % of a recurring unit represented by the following formula (A-3):

wherein Y is a hydrogen atom or methyl group, $R^3$ is at least one group selected from the group consisting of hydrogen atom, alkyl group having 2 to 5 carbon atoms and ultraviolet light absorbing residue, with the proviso that a case where Y is a methyl group and $R^3$ is a methyl group or ethyl group is excluded, the molar ratio of the urethane bond to the total of the recurring units represented by the formulas (A-1) to (A-3) being 4/100 to 30/100.

The methacrylate monomer corresponding to the recurring unit represented by the formula (A-1) is methyl methacrylate or ethyl methacrylate.

The methacrylate monomer corresponding to the recurring unit represented by the formula (A-2) is 2-hydroxyethyl methacrylate, 2-hydroxypropyl methacrylate, 3-hydroxypropyl methacrylate or 4-hydroxybutyl methacrylate. They may be used alone or in combination of two or more. Out of these, 2-hydroxyethyl methacrylate is preferred.

At least some of $R^a$'s in the recurring units represented by the formula (A-2) are single bonds and the others are hydrogen atoms. When $R^a$ is a single bond, it is bonded to other recurring unit represented by the formula (A-2) by an urethane bond.

That is, some of the recurring units represented by the formula (A-2) react with an isocyanate group of the component (B) which will be described hereinafter at the —$OR^a$ position and are bonded to other recurring unit represented by the formula (A-2) to form a crosslinked structure. As for the degree of crosslinking, the molar ratio of the urethane bond to the total of the recurring units represented by the formulas (A-1) to (A-3) is 4/100 to 30/100. The molar ratio is preferably 10/100 to 20/100.

Examples of the alkyl group having 2 to 5 carbon atoms represented by $R^3$ in the recurring unit represented by the formula (A-3) are ethyl group, propyl group, butyl group and pentyl group.

Examples of the (meth)acrylate monomer when $R^3$ in the recurring unit represented by the formula (A-3) is an alkyl group having 2 to 5 carbon atoms include methyl acrylate, ethyl acrylate, propyl acrylate, butyl acrylate, pentyl acrylate, propyl methacrylate, butyl methacrylate and pentyl methacrylate. They may be used alone or in combination of two or more.

The (meth)-acrylate monomer when $R^3$ in the recurring unit represented by the formula (A-3) is an ultraviolet light absorbing residue has an absorbance of 0.25 or more at a wavelength of 300 nm when measured in a chloroform solution having a concentration of 10 mg/L at an optical path length of 1.0 cm.

Examples of the above monomer include
2-(2'-hydroxy-5'-acryloxyethylphenyl)benzotriazole,
2-(2'-hydroxy-5'-acryloxyethoxyphenyl)benzotriazole,
2-(2'-hydroxy-5'-acryloxypropylphenyl)benzotriazole,
2-(2'-hydroxy-5'-acryloxypropoxyphenyl)benzotriazole,
2-(2'-hydroxy-5'-acryloxyethylphenyl)-5-chlorobenzotriazole, 2-(2'-hydroxy-3'-acryloxyethyl-5'-t-butylphenyl)benzotriazole, 2-(2'-hydroxy-3'-acryloxyethyl-5'-t-butylphenyl)-5-chlorobenzotriazole,
2-hydroxy-4-(acryloxyethoxy)benzophenone,
2-hydroxy-4-(acryloxypropoxy)benzophenone,
2,2'-dihydroxy-4-(acryloxyethoxy)benzophenone,
2-hydroxy-4-(acryloyloxyethyl)benzophenone,
2-(2'-hydroxy-5'-methacryloxyethylphenyl)benzotriazole,
2-(2'-hydroxy-5'-methacryloxyethoxyphenyl)benzotriazole,
2-(2'-hydroxy-5'-methacryloxypropylphenyl)benzotriazole,
2-(2'-hydroxy-5'-methacryloxypropoxyphenyl)benzotriazole,
2-(2'-hydroxy-5'-methacryloxyethylphenyl)-5-chlorobenzotriazole, 2-(2'-hydroxy-3'-methacryloxyethyl-5'-t-butylphenyl)benzotriazole,
2-(2'-hydroxy-3'-methacryloxyethyl-5'-t-butylphenyl)-5-chlorobenzotriazole,
2-hydroxy-4-(methacryloxyethoxy)benzophenone,
2-hydroxy-4-(methacryloxypropoxy)benzophenone,
2,2'-dihydroxy-4-(methacryloxyethoxy)benzophenone and
2-hydroxy-4-(methacryloyloxyethyl)benzophenone.

The content of the recurring unit represented by the formula (A-1) in the acrylic copolymer is 50 mol % or more, preferably 60 mol % or more, more preferably 70 mol % or more.

The content of the recurring unit represented by the formula (A-2) in the acrylic copolymer is 5 to 30 mol %, preferably 8 to 20 mol %, more preferably 10 to 20 mol %.

The content of the recurring unit represented by the formula (A-3) in the acrylic copolymer is 0 to 30 mol %.

Preferably, the component (A) is an acrylic copolymer which comprises 70 to 95 mol % of the recurring unit represented by the formula (A-1) and 5 to 30 mol % of the recurring unit represented by the formula (A-2).

Preferably, $R^1$ in the formula (A-1) is an ethyl group and $R^2$ in the formula (A-2) is an ethylene group in the component (A).

The molecular weight of the crosslinked acrylic copolymer is preferably 20,000 or more, more preferably 50,000 or more and 10,000,000 or less in terms of weight average molecular weight. The above acrylic resin having a molecular weight within the above range is preferred as it shows satisfactory adhesion and strength as the first layer.

Preferably, the first layer contains an ultraviolet light absorber which has an absorbance of 0.25 or more at a wavelength of 300 nm when measured in a chloroform solution having a concentration of 10 mg/L at an optical path length of 1.0 cm and satisfies the following expressions (i) to (iii):

$$2 \leq d \leq 8 \quad (i)$$

$$0.1 \leq c \leq 0.5 \quad (ii)$$

$$0.6 \leq d \times c \leq 3 \quad (iii)$$

wherein d is the thickness (μm) of the first layer, and c is the concentration (g/cm³) of the ultraviolet light absorber in the first layer.

The first layer can be formed by applying an acrylic resin composition which is the third aspect of the present invention to the polycarbonate substrate and curing it.

The thickness of the first layer is 1 to 12 μm, preferably 2 to 10 μm.

<Second Layer>

The second layer is composed of a crosslinked organosiloxane polymer.

The crosslinked organosiloxane polymer comprises recurring units represented by the following formulas (b-4) to (b-6):

wherein $Q^1$ and $Q^2$ are each an alkyl group having 1 to 4 carbon atoms, vinyl group or alkyl group having 1 to 3 carbon atoms substituted by at least one group selected from the group consisting of methacryloxy group, amino group, glycidoxy group and 3,4-epoxycyclohexyl group, the (b-4)/(b-5)/(b-6) molar ratio of the recurring units being 80-100/0-20/0-20.

The alkyl group represented by $Q^1$ and $Q^2$ is a methyl group or ethyl group.

The (b-4)/(b-5)/(b-6) molar ratio of the recurring units is preferably 85-100/0-15/0-15, more preferably 85-100/0-10/0-10.

The second layer can be formed by applying an organosiloxane resin composition which is the fourth aspect of the present invention to the first layer and curing it.

The laminate of the first aspect of the present invention and the laminate of the second aspect of the present invention can be used as a window material. The window material is used for automobiles and housing.

<Second Aspect>

The second aspect of the present invention is a laminate which comprises a polycarbonate substrate, a first layer formed on the surface of the polycarbonate substrate and a second layer formed on the surface of the first layer, wherein
the first layer is formed by applying an acrylic resin composition which is the third aspect of the present invention to the surface of the polycarbonate substrate and curing it, and the second layer is formed by applying an organosiloxane resin composition which is the fourth aspect of the present invention to the surface of the first layer and curing it.

The acrylic resin composition and the organosiloxane resin composition will be described hereinbelow.

<Third Aspect: Acrylic Resin Composition>

The acrylic resin composition of the present invention comprises components (A) to (E). A description is subsequently given of each of the components.

<Component (A): Acrylic Copolymer>

The acrylic copolymer (A) is a copolymer which comprises recurring units represented by the following formulas (A-1), (A-4) and (A-3).

The recurring unit represented by the formula (A-1) has the following structure:

(A-1)

wherein $R^1$ is a methyl group or ethyl group.

The methacrylate monomer corresponding to the recurring unit represented by the formula (A-1) is methyl methacrylate or ethyl methacrylate.

The recurring unit represented by the formula (A-4) has the following structure:

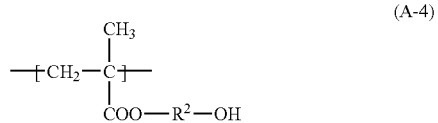

(A-4)

wherein $R^2$ is an alkylene group having 2 to 5 carbon atoms.

Examples of the alkylene group having 2 to 5 carbon atoms include ethylene group and propylene group. The methacrylate monomer corresponding to the recurring unit represented by the formula (A-4) is 2-hydroxyethyl methacrylate, 2-hydroxypropoyl methacrylate, 3-hydroxyproyl methacrylate or 4-hydroxybutyl methacrylate. They may be used alone or in combination of two or more. Out of these, 2-hydoxyethyl methacrylate is preferred.

The recurring unit represented by the formula (A-3) has the following structure:

(A-3)

wherein Y is a hydrogen atom or methyl group, $R^3$ is at least one group selected from the group consisting of hydrogen atom, alkyl group having 2 to 5 carbon atoms and ultraviolet light absorbing residue, with the proviso that a case where Y is a methyl group and $R^3$ is a methyl group or ethyl group is excluded.

Examples of the alkyl group having 2 to 5 carbon atoms represented by $R^3$ include ethylene group and propylene group.

The (meth)acrylate monomer when $R^3$ in the recurring unit represented by the formula (A-3) is an ultraviolet light absorbing residue has an absorbance of 0.25 or more at a wavelength of 300 nm when measured in a chloroform solution having a concentration of 10 mg/L at an optical path length of 1.0 cm.

Examples of the above monomer include
2-(2'-hydroxy-5'-acryloxyethylphenyl)benzotriazole,
2-(2'-hydroxy-5'-acryloxyethoxyphenyl)benzotriazole,
2-(2'-hydroxy-5'-acryloxypropylphenyl)benzotriazole,
2-(2'-hydroxy-5'-acryloxypropoxyphenyl)benzotriazole,
2-(2'-hydroxy-5'-acryloxyethylphenyl)-5-chlorobenzotriazole, 2-(2'-hydroxy-3'-acryloxyethyl-5'-t-butylphenyl)benzotriazole, 2-(2'-hydroxy-3'-acryloxyethyl-5'-t-butylphenyl)-5-chlorobenzotriazole,
2-hydroxy-4-acryloxyethoxybenzophenone,
2-hydroxy-4-acryloxypropoxybenzophenone,
2,2'-dihydroxy-4-acryloxyethoxybenzophenone,
2-hydroxy-4-acryloxyethylbenzophenone,
2-(2'-hydroxy-5'-methacryloxyethylphenyl)benzotriazole,
2-(2'-hydroxy-5'-methacryloxyethoxyphenyl)benzotriazole,
2-(2'-hydroxy-5'-methacryloxypropylphenyl)benzotriazole,
2-(2'-hydroxy-5'-methacryloxypropoxyphenyl)benzotriazole,
2-(2'-hydroxy-5'-methacryloxyethylphenyl)-5-chlorobenzotriazole, 2-(2'-hydroxy-3'-methacryloxyethyl-5'-t-butylphenyl)benzotriazole,
2-(2'-hydroxy-3'-methacryloxyethyl-5'-t-butylphenyl)-5-chlorobenzotriazole,
2-hydroxy-4-methacryloxyethoxybenzophenone,
2-hydroxy-4-(methacryloxypropoxy)benzophenone,
2,2'-dihydroxy-4-methacryloxyethoxybenzophenone and
2-hydroxy-4-methacryloxyethylbenzophenone.

The (meth)acrylate monomer corresponding to the recurring unit represented by the formula (A-3) is methyl acrylate, ethyl acrylate, methyl methacrylate or ethyl methacrylate. They are used alone or in combination of two or more.

The molecular weight of the acrylic copolymer is preferably 20,000 or more, more preferably 50,000 or more and 10,000,000 or less in terms of weight average molecular weight. The above acrylic resin having a molecular weight within the above range is preferred because it shows satisfactory adhesion and strength as the first layer.

The content of the recurring unit represented by the formula (A-1) in the acrylic copolymer is 50 mol % or more, preferably 60 mol % or more, more preferably 70 mol % or more. The content of the recurring unit represented by the formula (A-2) in the acrylic copolymer is 5 to 30 mol %, preferably 8 to 20 mol %, more preferably 10 to 20 mol %. The content of the recurring unit represented by the formula (A-3) in the acrylic copolymer is 0 to 30 mol %.

Preferably, the component (A) is an acrylic copolymer which comprises 70 to 95 mol % of the recurring unit represented by the formula (A-1) and 5 to 30 mol % of the recurring unit represented by the formula (A-2).

Preferably, $R^1$ in the formula (A-1) is an ethyl group and $R^2$ in the formula (A-2) is an ethylene group in the component (A).

<Component (B): Polyisocyanate>

The component (B) is a polyisocyanate compound and/or a blocked polyisocyanate compound having an isocyanate group content of 0.7 to 5 equivalents based on 1 equivalent of the hydroxy group of the component (A).

Examples of the polyisocyanate compound include polyisocyanates, adducts of a polyisocyanate with a polyhydric alcohol, adducts of a polyisocyanate with a low molecular weight polyester resin, cyclized polymers of polyisocyanates and isocyanate.burettes.

The polyisocyanates include tolylene diisocyanate, 4,4-diphenylmethane diisocyanate, 1,5-naphthalene diisocyanate, triphenylmethane triisocyanate, tolidine diisocyanate, xylene diisocyanate, lysine diisocyanate, trimethylhexamethylene diisocyanate, dimeric acid diisocyanate, hexamethylene diisocyanate, dicyclohexylmethane diisocyanate and isophorone diisocyanate.

The blocked polyisocyanate compound is a blocked isocyanate compound obtained by carrying out an addition reaction between a blocking agent typified by an oxime such as acetoxime or methyl ethyl ketoxime, an activated methylene compound such as dimethyl malonate, diethyl malonate, methyl acetoacetate, ethyl acetoacetate or acetyl acetone, alcohol such as methanol, ethanol, 2-propanol, n-butanol, sec-butanol or 2-ethyl-1-hexanol, or phenol such as phenol, cresol or ethyl phenol and the isocyanate group of a polyisocyanate compound, and thermally decomposing the adduct to form a polyisocyanate compound.

This blocked isocyanate is characterized in that it provides excellent storage stability to a coating composition because it forms an isocyanate group upon a thermal curing reaction, the isocyanate group is rarely consumed by a side-reaction, and a cured coating film which is hardly affected by an application environment and has stable physical properties can be obtained.

The above polyisocyanate compounds and blocked polyisocyanate compounds may be used alone or in combination of two or more. Out of these, aliphatic and/or alicyclic polyisocyanate compounds are particularly preferred because they have excellent weatherability.

As the polyisocyanate compound may be used an adduct type polyisocyanate compound obtained by blocking an adduct type polyisocyanate compound represented by the following formula (B-1) with a blocking agent:

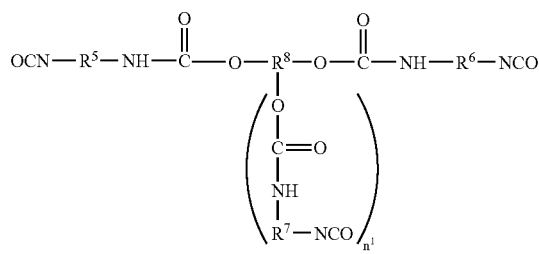

(B-1)

wherein $R^5$, $R^6$ and $R^7$ are the same or different and each a group obtained by removing an isocyanate group from an aliphatic and/or alicyclic diisocyanate compound(s), $R^8$ is a group obtained by removing a hydroxy group from a hydroxy compound, and $n^1$ is an integer of 0 or 2 or less.

Examples of the aliphatic diisocyanate compound include hexamethylene diisocyanate and examples of the alicyclic diisocyanate compound include cyclohexyl diisocyanate.

The polyisocyanate compound may be an isocyanurate type polyisocyanate compound obtained by blocking an isocyanurate type polyisocyanate compound represented by the following formula (B-2) with a blocking agent:

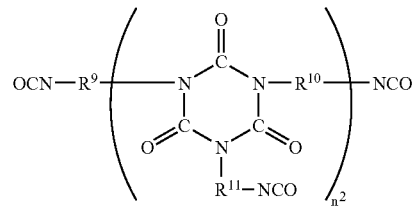

(B-2)

wherein $n^2$ is the number of nuclei of an isocyanurate prepolymer, its statistical average value is 1.0 to 4.0, and $R^9$ to $R^{11}$ are the same or different and each a group obtained by removing an isocyanate group from an aliphatic and/or alicyclic diisocyanate compound(s).

Examples of the aliphatic diisocyanate compound include hexamethylene diisocyanate and examples of the alicyclic diisocyanate compound include cyclohexyl diisocyanate.

Particularly preferably, $R^5$, $R^6$ and $R^7$ in the formula (B-1) and $R^9$, $R^{10}$ and $R^{11}$ in the formula (B-2) have 2 to 10 carbon atoms from the viewpoint of durability.

The blocking agent is preferably an oxime or activated methylene compound because they can be thermally cured at a lower temperature though it depends on the heat resistance of a transparent plastic substrate.

The content of the isocyanate group in the polyisocyanate compound or the blocked polyisocyanate compound is 5 to 60 wt %, preferably 6 to 55 wt %, the most preferably 6 to 50 wt %. When the content of the isocyanate group is lower than 5 wt %, the mixing ratio of the polyisocyanate compound and/or blocked polyisocyanate compound to the acrylic resin increases and the amount of the recurring unit represented by the above formula (A-1) contained in the coating film resin decreases with the result of poor adhesion to the plastic substrate. When the content of the isocyanate group is higher than 60 wt %, the flexibility of the coating layer deteriorates, whereby the coating layer may crack when the second layer is thermally cured or durability against environmental variations is impaired disadvantageously.

As for the mixing ratio of the component (A) and the component (B), the amount of the isocyanate group formed from the component (B) is 0.7 to 5 equivalents, preferably 0.75 to 3 equivalents, the most preferably 0.8 to 2 equivalents based on 1 equivalent of the hydroxy group of the acrylic resin as the component (A). By adjusting the mixing ratio as described above, the first layer can maintain excellent adhesion to the polycarbonate substrate and to the organosiloxane resin thermally cured layer as the second layer, has high crosslinking density, thereby rarely causing a reduction in crosslinking density by ultraviolet radiation, water and oxygen, and can maintain adhesion and durability against environmental variations and a high temperature environment for a long time. Thus, the first layer has excellent weatherability.

When the amount of the isocyanate group is smaller than 0.7 equivalent, crosslinking becomes unsatisfactory with the result of poor durability against a high temperature environment and the coating layer absorbs moisture with the result of deteriorated weatherability and hot water resistance as an unreacted hydroxy group shows high affinity for water molecules. When the amount of the isocyanate group is larger than 5 equivalents, the coating layer becomes very hard and fragile with an extremely high crosslinking density due to an allophanate bond, deteriorates in adaptability to environmental variations and is inferior in adhesion according to environmental variations.

<Component (C): Curing Catalyst>

The component (C) is a curing catalyst which is contained in an amount of 0 to 0.4 part by weight based on 100 parts by weight of the total of the components (A) and (B). An organic tin compound and/or a quaternary ammonium salt compound are/is used as the curing catalyst.

The component (C) is preferably an organic tin compound represented by the following formula:

$$R^x_m Sn(OCOR^y)_{4-m}$$

wherein $R^x$'s may be the same or different and each a hydrocarbon group having 1 to 8 carbon atoms, $R^y$'s may be the same or different and each a substituted or nonsubstituted hydrocarbon group having 1 to 17 carbon atoms, and m is an integer of 0 to 3.

The hydrocarbon group having 1 to 8 carbon atoms represented by $R^x$ is an alkyl group having 1 to 8 carbon atoms such as methyl group, ethyl group or propyl group. The hydrocarbon group having 1 to 17 carbon atoms represented by $R^y$ is an alkyl group having 1 to 17 carbon atoms such as ethyl group, heptyl group, hexyl group, octyl group, decyl group, dodecyl group or heptadecyl group. The substituent is, for example, a methyl group.

Typical examples of the organic tin compound include monobutyltin tris(2-ethylhexanoate), dimethyltin dineodecanoate, dioctyltin dineodecanoate, dimethylhydroxytin oleate, dibutyltin bis(2-ethylhexanoate), bis(2-ethylhexanoate) tin, monobutyltin triacetate, dibutyltin diacetate, tributyltin monoacetate, dibutyltin methyl meleate, monobutyltin tri(methylglycolate), monobutyltin tri(methylpropionate), monobutyltin trilaurate, dibutyltin dilaurate, tributyltin monolaurate, dibutyltin di(n-butylmaleate), monobutyltin tri(butylglycolate), monobutyltin tri(butylpropionate), monohexyltin trioctoate, dihexyltin dioctoate, trihexyltin monooctoate, dihexyltin di(n-octylmalate), monohexyltin tri(octylglycolate), monohexyltin tri(methylmalate), monooctyltin triacetate, dioctyltin diacetate, trioctyltin monoacetate, dioctyltin di(methylmalate), monooctyltin tri(methylglycolate), monooctyltin tri(methylpropionate), monooctyltin tripropionate, dioctyltin dipropionate, trioctyltin monopropionate, dioctyltin di(n-propylmalate), monooctyltin tri(propylglycolate), monooctyltin tri(propylpropionate), monooctyltin trioctoate, dioctyltin dioctoate, trioctyltin monooctoate, dioctyltin di(n-octylmalate), monooctyltin tri(octylglycolate), monooctyltin tri(octylpropionate), monooctyltin trilaurate, dioctyltin dilaurate, trioctyltin monolaurate, dioctyltin di(n-laurylmalate), monooctyltin tri(laurylglycolate), monooctyltin tri(laurylpropionate) and n-butyltin hydroxide oxide.

Typical examples of the quaternary ammonium salt compound include
2-hydroxyethyl.tri-n-butylammonium.2,2-dimethylpropionate,
2-hydroxyethyl.tri-n-butylammonium.2,2-dimethylbutanoate,
2-hydroxypropyl.tri-n-butylammonium.2,2-dimethylpropionate,
2-hydroxypropyl.tri-n-butylammonium.2,2-dimethylbutanoate,
2-hydroxypropyl.tri-n-butylammonium.2,2-dimethylpentanoate, 2-hydroxypropyl-tri-n-butylammonium.2-ethyl-2-methylpropionate,
2-hydroxypropyl.tri-n-butylammonium.2-ethyl-2-methylbutanoate, 2-hydroxypropyl.tri-n-butylammonium.2-ethyl-2-methylpentanoate,
2-hydroxypropyl.tri-n-octylammonium.2,2-dimethylpropionate,
2-hydroxypropyl.tri-n-octylammonium-2,2-dimethylbutanoate,
2-hydroxypropyl.triamylammonium.2,2-dimethylbutanoate and
2-hydroxypropyl.triamylammonium.2,2-dimethylpentanoate.

They may be used alone or in combination of two or more. Further, a tertiary amine such as dimethyl ethanolamine or triethylene diamine may be used together in the present invention.

The curing catalyst is used in an amount of 0 to 0.4 part by weight based on 100 parts by weight of the total of the components (A) and (B). It is preferably 0.001 to 0.4 part by weight, more preferably 0.002 to 0.3 part by weight. When it is larger than 0.4 part by weight, adhesion to the acrylic resin layer and the second layer lowers disadvantageously.

<Component (D): Ultraviolet Light Absorber>

The component (D) is an ultraviolet light absorber which is used in an amount of 10 to 50 parts by weight based on 100 parts by weight of the total of the components (A) and (B).

Examples of the ultraviolet light absorber include benzophenones such as 2,4-dihydroxybenzophenone,
2-hydroxy-4-methoxybenzophenone,
2-hydroxy-4-octoxybenzophenone and
2,2'-dihydroxy-4,4'-dimethoxybenzophenone; benzotriazoles such as 2-(5'-methyl-2'-hydroxyphenyl)benzotriazole,
2-(3'-t-butyl-5'-methyl-2'-hydroxyphenyl)benzotriazole and
2-(3',5'-di-t-butyl-2'-hydroxyphenyl)-5-chlorobenzotriazol; cyanoacrylates such as
ethyl-2-cyano-3,3-diphenyl acrylate and
2-ethylhexyl-2-cyano-3,3-diphenyl acrylate; salicylates such as phenyl salicylate and p-octylphenyl salicylate;
benzylidene malonates such as diethyl-p-methoxybenzylidene malonate and bis(2-ethylhexyl)benzylidene malonate; triazines such as
2-(4,6-diphenyl-1,3,5-triazin-2-yl)-5-[(methyl)oxy]-phenol,
2-(4,6-diphenyl-1,3,5-triazin-2-yl)-5-[(ethyl)oxy]-phenol,
2-(4,6-diphenyl-1,3,5-triazin-2-yl)-5-[(propyl)oxy]-phenol,
2-(4,6-diphenyl-1,3,5-triazin-2-yl)-5-[(butyl)oxy]-phenol and 2-(4,6-diphenyl-1,3,5-triazin-2-yl)-5-[(hexyl)oxy]-phenol; copolymers of
2-(2'-hydroxy-5-methacryloxyethylphenyl)-2H-benzotriazole
and a vinyl-based monomer copolymerizable with the monomer; copolymers of
2-(2'-hydroxy-5-acryloxyethylphenyl)-2H-benzotriazole
and a vinyl-based monomer copolymerizable with the monomer; and metal oxide fine particles such as titanium oxide, cerium oxide, zinc oxide, tin oxide, tungsten oxide, zinc sulfide and cadmium sulfide.

Commercially available products of the ultraviolet light absorber to be added to a coating include Tinubin 405, Tinubin 411L and CGL777MPA of Chiba Specialty Chemical Co., Ltd. which can be preferably used for the object of the present invention.

They may be used alone or in combination of two or more. The ultraviolet light absorber is used in an amount of 10 to 50 parts by weight, preferably 15 to 45 parts by weight based on 100 parts by weight of the total of the components (A) and (B). When the amount of the ultraviolet light absorber is smaller than 10 parts by weight, the substrate yellows and adhesion lowers due to high ultraviolet light transmission, resulting in deteriorated weatherability. When the amount is larger than 50 parts by weight, adhesion lowers disadvantageously.

<Component (E): Silane Coupling Agent>

The component (E) is a silane coupling agent which is used in an amount of 0 to 5 parts by weight based on 100 parts by weight of the total of the components (A) and (B).

Examples of the silane coupling agent include γ-(2-aminoethyl)aminopropyltrimethoxysilane, γ-(2-aminoethyl)aminopropylmethyldimethoxysilane, γ-methacryloxypropyltrimethoxysilane, N-β-(N-vinylbenzylaminoethyl)-γ-aminopropyltrimethoxy silane.hydrochloride, γ-glycidoxypropyltrimethoxysilane, γ-mercaptopropyltrimethoxysilane, vinyltriacetoxysilane, γ-anilinopropyltrimethoxysilane, vinyltrimethoxysilane, octadecyldimethy[3-(trimethoxysilyl)propyl]ammonium chloride and γ-ureidopropyltriethoxysilane. Partial hydrolysis and condensation products of the above silane coupling agents may also be used.

By adding this agent, adhesive force between the transparent plastic substrate and the first layer and between the first layer and the second layer can be maintained for a long time. These agents may be used alone or in combination of two or more.

The silane coupling agent is used in an amount of 0 to 5 parts by weight, preferably 0.2 to 5 parts by weight based on 100 parts by weight of the total of the components (A) and (B).

(Optical Stabilizer)

An optical stabilizer may be optionally contained in the acrylic resin composition used for the first layer. Examples of the optical stabilizer include hindered amines such as
bis(2,2,6,6-tetramethyl-4-piperidyl)carbonate,
bis(2,2,6,6-tetramethyl-4-piperidyl)saccinate,
bis(2,2,6,6-tetramethyl-4-piperidyl)sebacate,
4-benzoyloxy-2,2,6,6-tetramethylpiperidine,
4-octanoyloxy-2,2,6,6-tetramethylpiperidine,
bis(2,2,6,6-tetramethyl-4-piperidyl)diphenylmethane-p,p'-dicarbamate,
bis(2,2,6,6-tetramethyl-4-piperidyl)benzene-1,3-disulfonate and bis(2,2,6,6-tetramethyl-4-piperidyl)phenylphosphite, and nickel complexes such as nickel bis(octylphenyl) sulfide, nickel
complex-3,5-di-t-butyl-4-hydroxybenzylphosphoric acid monoethylate and nickel dibutyldithiocarbamate. They may be used alone or in combination of two or more. The optical stabilizer is used in an amount of preferably 0.01 to 50 parts by weight, more preferably 0.05 to 10 parts by weight based on 100 parts by weight of the total of the components (A) and (B).

(First Layer)

The first layer is obtained by applying an acrylic resin composition comprising the components (A) to (E) to the surface of the polycarbonate substrate and curing it.

The thickness of the acrylic resin layer is 1 to 12 μm, preferably 2 to 10 μm, more preferably 2 to 8 μm.

The first layer of the present invention is formed by dissolving the components (A) to (E) in a volatile solvent which does not react with the substrate or dissolve the substrate to prepare a coating composition, applying the coating composition to the surface of the substrate, heating it to remove the solvent and further heating it to react the hydroxy group of the component (A) with the isocyanate group of the component (B) for crosslinking.

The reacted isocyanate group is the isocyanate group of the polyisocyanate compound contained in the component (B) or an isocyanate group formed by heating the blocked polyisocyanate compound contained in the component (B).

(Solvent)

Examples of the solvent in the coating composition include ketones such as acetone, methyl ethyl ketone, methyl isobutyl ketone and cyclohexanone; ethers such as tetrahydrofuran, 1,4-dioxane and 1,2-dimethoxyethane; esters such as ethyl acetate and ethoxyethyl acetate; alcohols such as methanol, ethanol, 1-propanol, 2-propanol, 1-butanol, 2-butanol, 2-methyl-1-propanol, 2-methyl-2-propanol, 2-ethoxyethanol, 1-methoxy-2-propanol and 2-butoxyethanol; hydrocarbons such as n-hexane, n-heptane, isooctane, benzene, toluene, xylene, gasoline, light oil and kerosene; acetonitrile, nitromethane and water. They may be used alone or in combination of two or more.

The solid content of the coating resin in the coating composition comprising the components (A) to (E) is preferably 1 to 50 wt %, more preferably 3 to 30 wt %.

As for the application of the coating composition comprising the components (A) to (E) to the plastic substrate, bar coating, dip coating, flow coating, spray coating, spin coating or roller coating is suitably selected according to the shape of the substrate to be coated.

The substrate coated with the coating composition is generally heated at normal temperature to a temperature lower than the thermal deformation temperature of the substrate to dry and remove the solvent and thermally cure the composition. Thermal curing is preferably carried out at a high temperature to complete curing quickly as far as it is not higher than the heat resistance of the substrate. At normal temperature, thermal curing does not proceed completely and a coating layer having sufficiently high crosslinking density required for the first layer cannot be obtained. During this thermal curing, a crosslinkable group in the thermosetting acrylic resin composition reacts to increase the crosslinking density of the coating layer, thereby obtaining a coating layer having excellent adhesion, hot water resistance and durability under a high temperature environment.

Thermal curing is carried out by heating at preferably 80 to 160° C., more preferably 100 to 140° C., the most preferably 110 to 130° C. for preferably 10 minutes to 3 hours, more preferably 20 minutes to 2 hours, the most preferably 30 minutes to 90 minutes to crosslink the crosslinkable group, thereby making it possible to obtain a transparent plastic substrate having the above coating resin layer as the first layer. When the thermal curing time is shorter than 10 minutes, a crosslinking reaction does not proceed completely and a coating layer having poor durability under a high temperature environment and weatherability may be obtained. 3 hours or less of thermal curing is satisfactory from the viewpoint of the performance of the coating film.

By forming the first layer of a coating resin comprising the above acrylic resin as the main component, the adhesion of the second layer and to the polycarbonate substrate becomes high, thereby making it possible to obtain a laminate having excellent abrasion resistance and weatherability.

<Organosiloxane Resin Composition>

The organosiloxane resin composition of the present invention comprises components (a) to (d).

A description is subsequently given of each of the components.

<Component (a): Colloidal Silica>

The colloidal silica used as the component (a) in the present invention is obtained by dispersing silica fine particles having a diameter of 5 to 200 nm, preferably 5 to 40 nm into water or an organic solvent in a colloidal form. The colloidal silica may be either water-dispersible or organic solvent-dispersible but preferably water-dispersible. In the case of water-dispersible colloidal silica, it is considered that a plastic laminate having excellent abrasion resistance can be obtained because a large number of hydroxy groups are existent on the surface of each silica fine particle and are firmly bonded to the hydrolysate(s) and/or condensate(s) of alkoxysilanes.

The water-dispersible colloidal silica is acidic aqueous solution-dispersible or basic aqueous solution-dispersible. Although the water-dispersible colloidal silica may be either acidic aqueous solution-dispersible or basic aqueous solution-dispersible, it is preferably acidic aqueous solution-dispersible colloidal silica from the viewpoints of a large choice of curing catalysts and the suitable hydrolysis and condensation of a methyltrialkoxysilane.

Commercially available products of the colloidal silica dispersed in an acidic aqueous solution include Snowtex O of Nissan Chemical Industries, Ltd. and Cataloid SN of Catalysts & Chemicals Industries Co., Ltd., those of the colloidal silica dispersed in a basic aqueous solution include Snowtex 30 and Snowtex 40 of Nissan Chemical Industries, Ltd. and Cataloid S30 and Cataloid S40 of Catalysts & Chemicals Industries Co., Ltd., and those of the colloidal silica dispersed in an organic solvent include MA-ST, IPA-ST, NBA-ST, IBA-ST, EG-ST, XBA-ST, NPC-ST and DMAC-ST of Nissan Chemical Industries, Ltd. and OSCAL1132, OSCAL1232, OSCAL1332, OSCAL1432, OSCAL1532, OSCAL1632 and OSCAL1732 of Catalysts and Chemicals Industries Co., Ltd.

<Component (b)): Hydrolysate(s) and/or Condensate(s) of Alkoxysilanes>

The component (b) is a hydrolysate(s) and/or condensate(s) of alkoxysilanes represented by the following formulas (b-1) to (b-3):

$$Q^1Si(OQ^3)_3 \quad (b\text{-}1)$$

$$Q^1Q^2Si(OQ^3)_2 \quad (b\text{-}2)$$

$$Si(OQ^3)_4 \quad (b\text{-}3)$$

wherein $Q^1$ and $Q^2$ are each an alkyl group having 1 to 4 carbon atoms, vinyl group or alkyl group having 1 to 3 carbon atoms substituted by at least one group selected from the group consisting of methacryloxy group, amino group, glycidoxy group and 3,4-epoxycyclohexyl group, and $Q^3$ is an alkyl group having 1 to 4 carbon atoms, in a (b-1)/(b-2)/(b-3) ratio of 80-100/0-20/0-20.

Examples of the alkyl group represented by $Q^1$, $Q^2$ and $Q^3$ include methyl group and ethyl group.

Examples of the alkoxysilane represented by the formula (b-1) include methyltrimethoxysilane, methyltriethoxysilane, ethyltrimethoxysilane, isobutyltrimethoxysilane, vinyltrimethoxysilane, vinyltriethoxysilane, γ-methacryloxypropyltrimethoxysilane, β-(3,4-epoxycyclohexyl)ethyltrimethoxysilane, γ-glycidoxypropyltrimethoxysilane, γ-aminopropyltrimethoxysilane, γ-aminopropyltriethoxysilane, N-β(aminoethyl)-γ-aminopropyltrimethoxysilane and N-β(aminoethyl)-γ-aminopropyltriethoxysilane.

Examples of the alkoxysilane represented by the formula (b-2) include dimethyldimethoxysilane, vinylmethyldimethoxysilane, 3-methacryloxypropylmethyldimethoxysilane, 3-glycidoxypropylmethyldimethoxysilane and 3-aminopropylmethyldiethoxysilane.

Examples of the alkoxysilane represented by the formula (b-3) include tetramethoxysilane, tetraethoxysilane, tetra-n-propoxysilane, tetraisopropoxysilane, tetra-n-butoxysilane and tetraisobutoxysilane.

The (b-1)/(b-2)/(b-3) ratio of these components is preferably 85-100/0-15/0-15, more preferably 85-95/5-15/5-15.

The ($Si^a/Si^b$) molar ratio of Si derived from the component (a) to Si derived from the component (b) in the resin composition is 2/8-4/6, preferably 2.5/7.5-3.5/6.5.

<Component (c): Curing Catalyst>

The organosiloxane resin composition of the present invention further comprises a curing catalyst. Preferred examples of the catalyst include alkali metal salts such as lithium, sodium and potassium salts of aliphatic carboxylic acids such as formic acid, propionic acid, butyric acid, lactic acid, tartaric acid and succinic acid, and quaternary ammonium salts such as benzyltrimethylammonium salts, choline salts, tetramethylammonium salts and tetraethylammonium salts. Specifically, sodium acetate, potassium acetate, choline acetate and benzyltrimethylammonium acetate are preferably used.

When basic aqueous solution-dispersible colloidal silica is used as the colloidal silica and an aliphatic carboxylic acid is used as an acid for the hydrolysis of alkoxysilanes, a curing catalyst is already contained in the organosiloxane resin composition.

The required amount of the curing catalyst which differs according to the composition of an organosiloxane resin, progress in a hydrolytic reaction and condensation reaction, and thermal curing conditions is 0.01 to 10 parts by weight, preferably 0.1 to 5 parts by weight based on 100 parts by weight of the total of the components (a) and (b). When the amount is smaller than 0.01 part by weight, a sufficiently high curing speed is not obtained and when the amount is larger than 10 parts by weight, the storage stability of the organosiloxane resin composition may lower or a precipitate may be produced disadvantageously.

<Component (d): Solvent>

The solvent used in the organosiloxane resin composition of the present invention must dissolve the components (a) and (b) stably. Therefore, an alcohol is desirably contained in the solvent in an amount of at least 20 wt %, preferably at least 50 wt %.

Examples of the alcohol include methanol, ethanol, 1-propanol, 2-propanol, 1-butanol, 2-butanol, 2-methyl-1-propanol, 2-ethoxyethanol, 4-methyl-2-pentanol and 2-butoxyethanol. The alcohol is preferably a low-boiling alcohol having 1 to 4 carbon atoms, particularly preferably 2-propanol from the viewpoints of solubility, stability and coatability. The solvent further contains water which is contained in the water-dispersible colloidal silica and does not take part in the hydrolytic reaction, a lower alcohol which is produced by the hydrolysis of the alkoxysilanes, an organic solvent as a dispersion medium when organic solvent-dispersible colloidal silica is used, and an acid which is added to adjust pH of the organosiloxane resin composition.

Examples of the acid used to adjust pH include inorganic acids such as hydrochloric acid, sulfuric acid, nitric acid, phosphoric acid, nitrous acid, perchloric acid and sulfamic acid, and organic acids such as formic acid, acetic acid, propionic acid, butyric acid, oxalic acid, succinic acid, maleic acid, lactic acid and paratoluenesulfonic acid. Organic carboxylic acids such as formic acid, acetic acid, propionic acid, butyric acid, oxalic acid, succinic acid and maleic acid are preferred from the viewpoint of pH control ease.

Other solvent may be used if it is miscible with water/alcohol, as exemplified by ketones such as acetone, methyl ethyl ketone and methyl isobutyl ketone, ethers such as tetrahydrofuran, 1,4-dioxane and 1,2-dimethoxyethane, and esters such as ethyl acetate and ethoxyethyl acetate. The solvent is used in an amount of 50 to 900 parts by weight, preferably 150 to 700 parts by weight based on 100 parts by weight of the solid content of the organosiloxane resin.

The pH of the organosiloxane resin composition of the present invention is desirably adjusted to 3.0 to 6.0, preferably 4.0 to 5.5, by controlling the contents of the acid and the curing catalyst. Thereby, the gelation of the organosiloxane resin composition at normal temperature can be prevented and its storage stability can be improved. The organosiloxane resin composition becomes a stable composition by further aging for several hours to several days.

Further, the organosiloxane resin composition of the present invention can be mixed with a known leveling agent in order to improve its coatability and the smoothness of the obtained coating film. The amount of the agent is preferably 0.01 to 2 parts by weight based on 100 parts by weight of the organosiloxane resin composition. An ultraviolet light absorber, dye, pigment and filler may be added in limits that do not impair the object of the present invention.

The thus prepared organosiloxane resin composition can be applied to a molded product of a transparent resin such as a polycarbonate resin. It can be preferably applied to a molded product having an acrylic resin layer as a primer layer formed on a polycarbonate resin.

The organosiloxane resin composition of the present invention can be prepared by the following process, for example.

The alkoxysilanes represented by the formulas (b-1), (b-2) and (b-3) are subjected to hydrolytic and condensation reactions in a colloidal silica dispersion under acidic conditions.

When a dispersion of water-dispersible colloidal silica is used, water required for the hydrolytic reaction of the alkoxysilanes is supplied from this dispersion. Water may be further added if necessary. Water is used in an amount of 1 to 10 equivalents, preferably 1.5 to 7 equivalents, more preferably 3 to 5 equivalents based on 1 equivalent of the total of the alkoxysilanes.

The hydrolytic and condensation reactions of the alkoxysilanes must be carried out under acidic conditions as described above. To carry out hydrolysis under the above conditions, an acid is generally used as a hydrolyzing agent. The acid may be added to the alkoxysilanes or colloidal silica dispersion or to a mixture of the alkoxysilanes and the colloidal silica dispersion. The acid may be added one time or two or more times. When acidic aqueous solution-dispersible colloidal silica is used, the acid does not always need to be used because an acid contained in the colloidal silica keeps the reaction solution under acidic conditions.

Examples of the acid include inorganic acids such as hydrochloric acid, sulfuric acid, nitric acid, phosphoric acid, nitrous acid, perchloric acid and sulfamic acid, and organic acids such as formic acid, acetic acid, propionic acid, butyric acid, oxalic acid, succinic acid, maleic acid, lactic acid and paratoluenesulfonic acid.

When an inorganic acid is used as the acid, it is used in a concentration of 0.0001 to 2 mol/l, preferably 0.001 to 0.1 mol/l and when an organic acid is used, it is used in an amount of 0.1 to 50 parts by weight, preferably 1 to 30 parts by weight based on 100 parts by weight of a methyltrialkoxysilane.

As for the hydrolytic and condensation reaction conditions of the alkoxysilanes which cannot be given unconditionally because they differ according to the types of the alkoxysilanes used and the type and amount of colloidal silica existent in the system, the temperature of the system is 20 to 40° C., and the reaction time is 1 hour to several days. The hydrolytic reaction of the alkoxysilanes is an exothermic reaction but it is desired that the temperature of the system should not exceed 60° C. at the highest. After the hydrolytic reaction proceeds sufficiently under the above conditions, a condensation reaction is preferably carried out at 40 to 80° C. for 1 hour to several days for the stabilization of the coating agent.

The alkoxysilanes of the above formulas (b-1), (b-2) and (b-3) are hydrolyzed by this reaction to become hydrolysates represented by the following formulas:

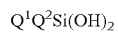

wherein $Q^1$ and $Q^2$ are the same as formulas (b-1) to (b-3), a condensation reaction between the formed Si—OH and Si—OH contained in the colloidal silica or Si—OH in the molecule of the hydrolysate of other trialkoxysilane different from that molecule occurs, thereby forming an Si—O—Si bond, and a condensation reaction between the formed condensate and another Si—OH occurs, thereby forming an Si—O—Si bond. The hydrolytic reaction and the condensation reaction proceed not completely but partially.

When the silicon nuclear magnetic resonance spectrum ($^{29}$Si-NMR) of the reaction solution is measured, the chemical shifts of the organosiloxane resin composition are such that a peak based on the silicon atom of a condensate of two trialkoxysilanes shifts from −46.5 ppm to −48.5 ppm, a peak based on a silicon atomic group derived from a trialkoxysilane having one condensed hydroxyl group at a terminal of a silicone oligomer shifts from −52.5 ppm to −61.0 ppm, a peak based on a silicon atomic group derived from a trialkoxysilane having two condensed hydroxyl groups of a silicone oligomer shifts from −61.0 ppm to −70.0 ppm, and a peak based on a silicon atomic group derived from a trialkoxysilane having three condensed hydroxyl groups of a silicone oligomer and a peak based on a silicon atomic group bonded to colloidal silica shift from −95 ppm to −130 ppm when a peak based on the silicon atom of tetramethylsilane is at 0 ppm. Peaks based on the silicon atoms of tetraalkoxysilane and dialkoxysilane appear at a region other than the above.

There are preferred hydrolysis and condensation rates for the organosiloxane resin composition. When the hydrolytic reaction does not proceed fully, the evapotranspiration of the raw material trialkoxysilane during thermal curing and the proceeding of a drastic curing reaction may cause a hair crack. When the condensation reaction proceeds too far, the diameters of the particles contained in the sol become too large, thereby making impossible a suitable crosslinking reaction with the result of deteriorated abrasion resistance.

When the silicon nuclear magnetic resonance spectrum ($^{29}$Si-NMR) of the organosiloxane resin composition of the present invention was measured using deuterium oxide (D$_2$O) as a measurement solvent at a measurement frequency of 79 MHz, a measurement pulse of 6.0 µs, a repetition time of 30 sec. and a broadening factor of 5 Hz, the chemical shifts of the silicon atoms of the organosiloxane resin composition preferably satisfy the following expressions:

$0.002 \leq [X]/[S] \leq 0.2$ and $0.6 \leq [Y]/[Z] \leq 3$ wherein [S] is the integrated value of all the peaks at a range from −46.5 ppm to −70.0 ppm, [X] is the integrated value of all the peaks at a range from −46.5 ppm to −48.5 ppm, [Y] is the integrated value of all the peaks at a range from −52.5 ppm to −61.0 ppm, and [Z] is the integrated value of all the peaks at a range from −61.0 ppm to −70.0 ppm when the peak of the silicon atom of tetramethylsilane is at 0 ppm. The organosiloxane resin composition does not crack during thermal curing and has sufficiently high abrasion resistance.

The above integrated values preferably satisfy $0.003 \leq [X]/[S] \leq 0.150$ and $0.75 \leq [Y]/[Z] \leq 2.25$, the most preferably $0.003 \leq [X]/[S] \leq 0.150$ and $0.75 \leq [Y]/[Z] \leq 2.00$.

If colloidal silica is not used in the organosiloxane resin composition, there will be a case where scratch resistance is unsatisfactory even when the silicon nuclear magnetic resonance spectrum of the composition is within the above range of the present invention.

In the present invention, the mixing ratio of the component (a) and the component (b) is determined based on the stability of the organosiloxane resin composition and the transparency, abrasion resistance, scratch resistance, adhesion and the existence of a crack of the obtained cured film. As for the mixing ratio of the two components when the total amount of the components (a) and (b) is 100 wt %, the amount of the component (a) is 10 to 60 wt % and the amount of the component (b) is 40 to 90 wt % in terms of $Q^1{}_m Q^2{}_n SiO_{(4-n-m)/2}$. Preferably, the amount of the component (a) is 10 to 40 wt % and the amount of the component (b) is 60 to 90 wt % in terms of $Q^1{}_m Q^2{}_n SiO_{(4-m-n)/2}$.

The pH of the organosiloxane resin composition is desirably adjusted to 3.0 to 6.0, preferably 4.0 to 5.5 by controlling the contents of the acid and the curing catalyst. This can prevent the gelation of the organosiloxane resin composition at normal temperature and improve the storage stability of the composition. In general, the organosiloxane resin composition becomes a stable composition by aging for several hours to several days.

The organosiloxane resin composition may further comprise as a component (e) an acrylic copolymer which contains 50 to 90 mol % of a recurring unit represented by the following formula (A-1):

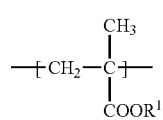

(A-1)

wherein R$^1$ is a methyl group or ethyl group, and 10 to 50 mol % of a recurring unit represented by the following formula (A-4):

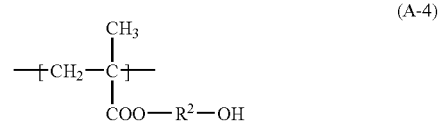

(A-4)

wherein R$^2$ is an alkylene group having 2 to 5 carbon atoms, in an amount of 0.1 to 20 parts by weight based on 100 parts by weight of the organosiloxane resin composition.

The organosiloxane resin composition of the present invention may comprise a known leveling agent to improve coatability and the smoothness of the obtained coating film. The amount of the leveling agent is preferably 0.01 to 2 parts by weight based on 100 parts by weight of the organosiloxane resin composition. An ultraviolet light absorber, dye, pigment and filler may be added in limits that do not impair the object of the present invention.

The thus prepared organosiloxane resin composition can be applied to a molded product of a transparent resin such as a polycarbonate resin. It can be particularly preferably applied to a molded product having an acrylic resin layer as a primer layer on a polycarbonate resin.

EXAMPLES

The following examples are provided for the purpose of further illustrating the present invention but are in no way to be taken as limiting.

Examples 1 to 5

The laminates obtained in the following examples were evaluated by the following methods. "Parts" and "%" in the examples mean "parts by weight" and "% by weight", respectively.

(1) Storage stability of a coating: The state of a coating was visually evaluated after the acrylic resin composition was kept at 23° C. for 3 months. When the gelation of the coating was not observed, it was evaluated as satisfactory.

(2) Evaluation of appearance: The appearance (existence of foreign matter) and the existence of a crack of the coating layer of a test sample were visually checked.

(3) Adhesion: The coating layer was cut with a cutter knife at intervals of 1 mm to form 100 squares, the adhesive tape of Nichiban Co., Ltd. (trade name: Cellotape) was affixed to the cut coating layer by pressure and strongly stripped off at a right angle, and the remaining squares on the substrate were counted. Adhesion was evaluated based on the count of the remaining squares (JIS K5400).

(4) Scratch resistance: After the test sample was rubbed with #0000 steel wool, the surface state of the test sample was visually checked to evaluate its scratch resistance based on the following five criteria.

1: not scratched at all after 10 times of rubbing under a load of 500 g

2: slightly scratched after 10 times of rubbing under a load of 500 g

3: somewhat scratched after 10 times of rubbing under a load of 500 g

4: scratched after 10 times of rubbing under a load of 500 g

5: scratched after 10 times of rubbing under a load of 100 g (5) Abrasion resistance: A Taber abrasion test was made on one of the coating layers on both sides by turning the CS-10F truck wheel of Calibrase Co. Ltd. 1,000 times under a load of 500 g in accordance with JIS K6735 to measure a haze difference ΔH before and after the Taber abrasion test to evaluate Abrasion resistance. The truck wheel was refaced with the S-11 abrasive paper in place of the AA-400 abrasive paper by turning it 25 times.

(6) Hot water resistance: The test sample was immersed in boiling water for 3 hours and 10 hours to evaluate a change in the appearance and the adhesion of the coating layer.

(7) Environmental cycle test: After the test sample was left in a 80° C. and 80% RH environment for 4 hours, 25° C. and 50% RH environment for 1 hour, −15° C. environment for 4 hours and 25° C. and 50% RH environment for 1 hour and this cycle was repeated 20 times, the test sample was taken out to evaluate its appearance and adhesion.

(8) High-temperature environment durability: After the test sample was left in a 105° C. environment for 100 hours, it was taken out to evaluate its appearance and adhesion.

(9) Moist heat resistance: After the test sample was left in a steam sterilizer maintained at 110° C. for 5 hours, it was taken out to evaluate its appearance and adhesion.

(10) Weatherability: An exposure test was made on the test sample for 2,000 hours and 2,500 hours at a UV radiation strength of 180 W/m$^2$ and a black panel temperature of 63° C. while it was exposed to 18 minutes of rainfall every 120 minutes, using the SX-75 super xenon weather meter of Suga Shikenki Co., Ltd. without changing the UV exposed surface. The test sample was taken out to evaluate its appearance, the adhesion of its UV exposed surface and a change in its yellow index (ΔYI) before and after the test. (The measurement of yellow index (YI) was carried out using the SE-2000 spectral calorimeter of Nippon Denshoku Co., Ltd.)

Reference Example 1

Synthesis of Acrylic Resin (I)

90.1 parts of methyl methacrylate (to be abbreviated as MMA hereinafter), 13 parts of 2-hydroxyethyl methacrylate (to be abbreviated as HEMA hereinafter), 0.14 part of azobisisobutyronitrile (to be abbreviated as AIBN hereinafter) and 200 parts of 1,2-dimethoxyethane were added to a flask equipped with a reflux condenser and stirrer whose inside had been substituted with nitrogen to be mixed and dissolved together. Thereafter, a reaction was carried out at 70° C. in a stream of nitrogen for 6 hours under agitation. The obtained reaction solution was added to n-hexane and purified by re-precipitation to obtain 81 parts of a copolymer (acrylic resin (I)) having an MMA/HEMA ratio of 90/10 (molar ratio). The copolymer had a hydroxy group value of 54.3 mgKOH/g and a weight average molecular weight of 180,000 in terms of polystyrene when measured by GPC (column; Shodex GPCA-804, elute; THF).

Reference Example 2

Synthesis of Acrylic Resin (II)

85 parts of a copolymer (acrylic resin (II)) having an MMA/HEMA ratio of 80/20 (molar ratio) was obtained in the same manner as in Reference Example 1 except that 80.1 parts of MMA, 26 parts of HEMA and 0.18 part of AIBN were used.

The copolymer had a hydroxy group value of 106.0 mgKOH/g and a weight average molecular weight of 80,000 in terms of polystyrene.

Reference Example 3

Synthesis of Acrylic Resin (III)

98 parts of a copolymer (acrylic resin (III)) having an EMA/HEMA ratio of 90/10 (molar ratio) was obtained in the same manner as in Reference Example 1 except that 102.7 parts of ethyl methacrylate (to be abbreviated as EMA hereinafter), 13 parts of HEMA and 0.18 part of AIBN were used. The copolymer had a hydroxy group value of 48.7 mgKOH/g and a weight average molecular weight of 90,000 in terms of polystyrene.

Reference Example 4

Synthesis of Acrylic Resin (IV)

97 parts of a copolymer (acrylic resin (IV)) having an EMA/HEMA ratio of 85/15 (molar ratio) was obtained in the same manner as in Reference Example 1 except that 97 parts of EMA, 19.5 parts of HEMA and 0.18 part of AIBN were used. The copolymer had a hydroxy group value of 72.5 mgKOH/g and a weight average molecular weight of 83,000 in terms of polystyrene.

Reference Example 5

Synthesis of Acrylic Resin (V)

108 parts of a copolymer (acrylic resin (V)) having an EMA/HEMA/MEBT ratio of 80/10/10 (molar ratio) was obtained in the same manner as in Reference Example 1 except that 91.2 parts of EMA, 13 parts of HEMA and 32.3 parts of 2-(2'-hydroxy-5'-methacryloxyethylphenyl)benzotriazole (to be abbreviated as MEBT hereinafter) were used. The copolymer had a hydroxy group value of 41.3 mgKOH/g and a weight average molecular weight of 80,000 in terms of polystyrene.

The monomer compositions of the acrylic resins (I) to (V) are shown in Table 1.

Example 1

Preparation of Acrylic Resin Composition

<Acrylic Resin Composition (i-1)>

10.0 parts of the above acrylic resin (I) and 2.88 parts of 2-(2'-hydroxy-5'-t-octylphenyl)benzotriazole were dissolved in a mixed solvent of 33 parts of methyl isobutyl ketone, 13 parts of methyl ethyl ketone and 26 parts of 2-butanol, 4.39 parts of Takenate XB-72-H6 (polyisocyanate compound precursor of Mitsui Takeda Chemical Co., Ltd.) was added to the resulting solution to ensure that the amount of the isocyanate group became 1.0 equivalent based on 1 equivalent of the hydroxy group of the above acrylic resin (I), and further 0.003 part of dibutyltin dilaurate was added and stirred at 25° C. for 30 minutes to prepare an acrylic resin composition (i-1).

<Acrylic Resin Composition (i-2)>

10.0 parts of the above acrylic resin (II) and 3.64 parts of 2,4-dihydroxybenzophenone were dissolved in a mixed solvent of 64 parts of methyl isobutyl ketone and 32 parts of 2-butanol, 13.68 parts of Duranate MF20-B (polyisocyanate compound precursor of Asahi chemical Industry Co., Ltd.) was added to the resulting solution to ensure that the amount of the isocyanate group became 1.0 equivalent based on 1 equivalent of the hydroxy group of the above acrylic resin (II), and further 0.01 part of dimethyltin dineodecanoate was added and stirred at 25° C. for 30 minutes to prepare an acrylic resin composition (i-2).

<Acrylic Resin Composition (i-3)>

10.0 parts of the above acrylic resin (III) and 2.59 parts of 2-(2'-hydroxy-5'-t-octylphenyl)benzotriazole were dissolved in a mixed solvent of 42 parts of methyl isobutyl ketone and 28 parts of 2-butanol, 2.96 parts of VESTANAT B1358/100 (polyisocyanate compound precursor of Degusa Japan Co., Ltd.) was added to the resulting solution to ensure that the amount of the isocyanate group became 1.0 equivalent based on 1 equivalent of the hydroxy group of the above acrylic resin (III), and further 0.003 part of dibutyltin dilaurate was added and stirred at 25° C. for 30 minutes to prepare an acrylic resin composition (i-3).

<Acrylic Resin Composition (i-4)>

10.0 parts of the above acrylic resin (III) and 2.71 parts of 2-(2'-hydroxy-5'-t-octylphenyl)benzotriazole were dissolved in a mixed solvent of 32 parts of methyl isobutyl ketone, 28 parts of 2-butanol and 10 parts of xylene, 3.56 parts of VESTANAT B1358/100 was added to the resulting solution to ensure that the amount of the isocyanate group became 1.2 equivalents based on 1 equivalent of the hydroxy group of the above acrylic resin (III), and further 0.005 part of monobutyltin tris(2-ethylhexanoate) was added and stirred at 25° C. for 30 minutes to prepare an acrylic resin composition (i-4).

<Acrylic Resin Composition (i-5)>

10.0 parts of the above acrylic resin (IV) and 2.85 parts of 2,4-dihydroxybenzophenone were dissolved in a mixed solvent of 56 parts of methyl isobutyl ketone and 28 parts of 2-butanol, 5.83 parts of Takenate XB-72-H6 was added to the resulting solution to ensure that the amount of the isocyanate group became 1.0 equivalent based on 1 equivalent of the hydroxy group of the above acrylic resin (IV), and further 0.005 part of dibutyltin dilaurate was added and stirred at 25° C. for 30 minutes to prepare an acrylic resin composition (i-5).

<Acrylic Resin Composition (i-6)>

10.0 parts of the above acrylic resin (IV) and 3.12 parts of 2-(2'-hydroxy-5'-t-octylphenyl)benzotriazole were dissolved in a mixed solvent of 50 parts of methyl isobutyl ketone, 10 parts of methyl ethyl ketone and 30 parts of 2-butanol, 9.36 parts of Duranate MF20-B was added to the resulting solution to ensure that the amount of the isocyanate group became 1.0 equivalent based on 1 equivalent of the hydroxy group of the above acrylic resin (IV), and further 0.005 part of dibutyltin dilaurate was added and stirred at 25° C. for 30 minutes to prepare an acrylic resin composition (i-6).

<Acrylic Resin Composition (i-7)>

10.0 parts of the above acrylic resin (V) and 1.95 parts of 2-(2'-hydroxy-5'-t-octylphenyl)benzotriazole were dissolved in a mixed solvent of 24 parts of methyl isobutyl ketone, 10 parts of methyl ethyl ketone, 32 parts of 2-butanol and 10 parts of 1-methoxy-2-propanol, 3.00 parts of VESTANAT B1358/100 was added to the resulting solution to ensure that the amount of the isocyanate group became 1.2 equivalents based on 1 equivalent of the hydroxy group of the above acrylic resin (V), and further 0.01 part of monobutyltin(2-ethylhexanoate) was added and stirred at 25° C. for 30 minutes to prepare an acrylic resin composition (i-7).

<Acrylic Resin Composition (i-8)>

10.0 parts of the above acrylic resin (V) and 1.88 parts of 2-(2'-hydroxy-5'-t-octylphenyl)benzotriazole were dissolved in a mixed solvent of 42 parts of methyl isobutyl ketone and 28 parts of 2-butanol, 2.50 parts of VESTANAT B1358/100 was added to the resulting solution to ensure that the amount of the isocyanate group became 1.0 equivalent based on 1 equivalent of the hydroxy group of the above acrylic resin (V), and further 0.005 part of dibutyltin dilaurate was added and stirred at 25° C. for 30 minutes to prepare an acrylic resin composition (i-8).

<Acrylic Resin Composition (i-9)>

10.0 parts of the above acrylic resin (I) and 2.52 parts of 2-(2'-hydroxy-5'-t-octylphenyl)benzotriazole were dissolved in a mixed solvent of 46 parts of methyl isobutyl ketone and 23 parts of 2-butanol, 2.66 parts of VESTANAT B1358/100 was added to the resulting solution to ensure that the amount of the isocyanate group became 0.8 equivalent based on 1 equivalent of the hydroxy group of the above acrylic resin (I), and further 0.001 part of dibutyltin dilaurate was added and stirred at 25° C. for 30 minutes to prepare an acrylic resin composition (i-9).

<Acrylic Resin Composition (i-10)>

10.0 parts of the above acrylic resin (I) and 2.80 parts of 2-(2'-hydroxy-5'-t-octylphenyl)benzotriazole were dissolved in a mixed solvent of 50 parts of methyl isobutyl ketone and 25 parts of 2-butanol, 3.99 parts of VESTANAT B1358/100 was added to the resulting solution to ensure that the amount of the isocyanate group became 1.2 equivalents based on 1 equivalent of the hydroxy group of the above acrylic resin (I), and further 0.003 part of dibutyltin dilaurate was added and stirred at 25° C. for 30 minutes to prepare an acrylic resin composition (i-10).

<Acrylic Resin Composition (i-11)>

10.0 parts of the above acrylic resin (I) and 2.80 parts of 2-(2'-hydroxy-5'-t-octylphenyl)benzotriazole were dissolved in a mixed solvent of 50 parts of methyl isobutyl ketone and 25 parts of 2-butanol, 3.99 parts of VESTANAT B1358/100 was added to the resulting solution to ensure that the amount of the isocyanate group became 1.2 equivalents based on 1 equivalent of the hydroxy group of the above acrylic resin (I), and further 0.01 part of 2-hydroxyethyl.tri-n-butylammonium.2,2-dimethylpropionate (to be abbreviated as HEBAP hereinafter) was added and stirred at 25° C. for 30 minutes to prepare an acrylic resin composition (i-11).

<Acrylic Resin Composition (i-12)>

10.0 parts of the above acrylic resin (III) and 2.00 parts of an ultraviolet light absorber (Tinubin 411L of Chiba Specialty Chemicals Co., Ltd.) were dissolved in a mixed solvent of 50 parts of methyl isobutyl ketone and 25 parts of 2-butanol, 2.96 parts of VESTANAT B1358/100 was added to the resulting solution to ensure that the amount of the isocyanate group became 1.0 equivalent based on 1 equivalent of the hydroxy group of the above acrylic resin (III), and further 0.005 part of dimethyltin dineodecanoate and 1.5 parts of a silane coupling agent (5% ethanol solution of APZ-6633 of Nippon Unicar Co., Ltd.) were added and stirred at 25° C. for 30 minutes to prepare an acrylic resin composition (i-12).

<Acrylic Resin Composition (i-13)>

10.0 parts of the above acrylic resin (IV) and 1.50 parts of an ultraviolet light absorber (CGL777 MPA of Chiba Specialty Chemicals Co., Ltd.) were dissolved in a mixed solvent of 48 parts of methyl isobutyl ketone and 22 parts of 2-butanol, 4.41 parts of VESTANAT B1358/100 was added to the resulting solution to ensure that the amount of the isocyanate group became 1.0 equivalent based on 1 equivalent of the hydroxy group of the above acrylic resin (IV), and further 0.007 part of dibutyltin dilaurate and 1.2 parts of a silane coupling agent (5% ethanol solution of APZ-6633 of Nippon Unicar Co., Ltd.) were added and stirred at 25° C. for 30 minutes to prepare an acrylic resin composition (i-13). The components of the acrylic resin compositions (i-1) to (i-13) are shown in Table 2.

Example 2

Preparation of Organosiloxane Resin Composition

<Tetraethoxysilane Hydrolysis and Condensation Product Solution (X)>

208 parts of tetraethoxysilane and 81 parts of 0.01 N hydrochloric acid were mixed together under cooling with iced water. This mixed solution was stirred at 25° C. for 3 hours and diluted with 11 parts of isopropanol to obtain 300 parts of a tetraethoxysilane hydrolysis and condensation product solution (X).

<Organosiloxane Resin Composition (ii-1)>

2 parts of distilled water and 20 parts of acetic acid were added to 100 parts of a water-dispersible colloidal silica dispersion (Snowtex 30 of Nissan Chemical Industries, Ltd., solid content of 30 wt %) and stirred, and 130 parts of methyltrimethoxysilane was added to this resulting dispersion under cooling with iced water. This mixed solution was stirred at 25° C. for 1 hour, and the obtained reaction solution was mixed with 2 parts of sodium acetate as a curing catalyst under cooling with iced water and diluted with 200 parts of isopropanol to prepare an organosiloxane resin composition (ii-1).

<Organosiloxane Resin Composition (ii-2)>

20 parts of acetic acid was added to 100 parts of a water-dispersible colloidal silica dispersion (Snowtex 30 of Nissan Chemical Industries, Ltd., solid content of 30 wt %) and stirred, and 122 parts of methyltrimethoxysilane was added to this resulting dispersion under cooling with iced water. This mixed solution was stirred at 25° C. for 1 hour, and the obtained reaction solution was mixed with 1 part of potassium acetate as a curing catalyst under cooling with iced water and diluted with 408 parts of isopropanol to prepare an organosiloxane resin composition (ii-2).

<organosiloxane Resin Composition (ii-3)>

28 parts of distilled water and 20 parts of acetic acid were added to 60 parts of a water-dispersible colloidal silica dispersion (Snowtex 30 of Nissan Chemical Industries, Ltd., solid content of 30 wt %) and stirred, and 130 parts of methyltrimethoxysilane was added to this resulting dispersion under cooling with iced water. This mixed solution was stirred at 25° C. for 1 hour, and the obtained reaction solution was mixed with 4 parts of benzyltrimethylammonium acetate as a curing catalyst under cooling with iced water and diluted with 172 parts of isopropanol to prepare an organosiloxane resin composition (ii-3).

<Organosiloxane Resin Composition (ii-4)>

12 parts of distilled water and 20 parts of acetic acid were added to 100 parts of a water-dispersible colloidal silica dispersion (Snowtex 30 of Nissan Chemical Industries, Ltd., solid content of 30 wt %) and stirred, and 134 parts of methyltrimethoxysilane was added to this resulting dispersion under cooling with iced water. This mixed solution was stirred at 25° C. for 1 hour, and the obtained reaction solution was mixed with 1 part of sodium acetate as a curing catalyst and diluted with 200 parts of isopropanol to prepare an organosiloxane resin composition (ii-4).

<Organosiloxane Resin Composition (ii-5)>

2 parts of distilled water was added to 100 parts of a water-dispersible colloidal silica dispersion (Cataloid SN30 of Catalysts & Chemicals Industries Co., Ltd., solid content of 30 wt %) and stirred, and 130 parts of methyltrimethoxysilane was added to this resulting dispersion under cooling with iced water. This mixed solution was stirred at 25° C. for 1 hour, and the obtained reaction solution was mixed with 2 parts of sodium acetate as a curing catalyst under cooling with iced water and diluted with 200 parts of isopropanol to prepare an organosiloxane resin composition (ii-5).

<Organosiloxane Resin Composition (ii-6)>

12 parts of distilled water and 20 parts of acetic acid were added to 100 parts of a water-dispersible colloidal silica dispersion (Snowtex 30 of Nissan Chemical Industries, Ltd., solid content of 30 wt %) and stirred, and 134 parts of methyltrimethoxysilane was added to this resulting dispersion under cooling with iced water. This mixed solution was stirred at 25° C. for 1 hour, and the obtained reaction solution was mixed with 20 parts of the tetraethoxysilane hydrolysis and condensation product solution (X) and 1 part of sodium acetate as a curing catalyst and diluted with 200 parts of isopropanol to prepare an organosiloxane resin composition (ii-6).

<Organosiloxane Resin Composition (ii-7)>

0.1 part of 35% hydrochloric acid was added to 100 parts of a water-dispersible colloidal silica dispersion (Cataloid SN30 of Catalysts & Chemicals Industries Co., Ltd., solid content of 30 wt %) and stirred, and 136 parts of methyltrimethoxysilane and 20.3 parts of dimethyldimethoxysilane were added to this resulting dispersion under cooling with iced water. This mixed solution was stirred at 25° C. for 6 hours, and the obtained reaction solution was mixed with 1 part of a 45% choline methanol solution as a curing catalyst and 4 parts of acetic acid as a pH modifier and diluted with 200 parts of isopropanol to prepare an organosiloxane resin composition (ii-7).

<Organosiloxane Resin Composition (ii-8)>

An organosiloxane resin composition (ii-8) was prepared by dissolving 3 parts of the acrylic resin (III) in 432 parts of the above organosiloxane resin composition (ii-5).

The compositions of the obtained organosiloxane resin compositions (ii-1) to (ii-8) are shown in Table 3.

Example 3

Evaluation of Storage Stability of Acrylic Resin Composition

The state of each of the acrylic resin compositions (i-1) to (i-13) was visually evaluated after it was kept at 23° C. for 3 months. When the gelation of the composition was not observed, it was evaluated as satisfactory. The results are shown in Table 4.

Example 4

Manufacture of Laminate

The acrylic resin composition (i-1) was applied to both sides of a 5 mm-thick PC resin sheet by dip coating to a film thickness of 4.0 μm after thermal curing, left at 25° C. for 20 minutes and thermally cured at 130° C. for 1 hour. The organosiloxane resin composition (ii-1) was applied to the surfaces of the coating films of the sheet by dip coating to a film thickness of 5.0 μm after thermal curing, left at 25° C. for 20 minutes and thermally cured at 120° C. for 1 hour. The evaluation results of the obtained laminate 1 are shown in Table 5.

Similarly, the acrylic resin compositions and the organosiloxane resin compositions shown in Table 5 were applied and thermally cured to obtain laminates 2 to 17. The evaluation results of the laminates 2 to 17 are shown in Table 5.

Example 5

Triangular Rear Car Window

A 5 mm-thick injection molded article for a triangular rear car window was manufactured from a PC resin. The acrylic resin composition (i-4) was applied to the injection molded article by dip coating to a film thickness of 4.0 μm after thermal curing, left at 25° C. for 20 minutes and thermally cured at 130° C. for 1 hour. The organosiloxane resin composition (ii-4) was applied to the surfaces of the coating films of the sheet by dip coating to a film thickness of 4.0 μm after thermal curing, left at 25° C. for 20 minutes and thermally cured at 120° C. for 1 hour. The evaluation results of the obtained laminate 18 are shown in Table 5.

TABLE 1

| Acrylic resin | Monomer | | | | |
|---|---|---|---|---|---|
| | MMA | EMA | HEMA | AIBN | MEBT |
| (I) | 90.1 | | 13 | 0.14 | |
| (II) | 80.1 | | 26 | 0.18 | |
| (III) | | 102.7 | 13 | 0.18 | |
| (IV) | | 97 | 19.5 | 0.18 | |
| (V) | | 91.2 | 13 | | 32.3 |

TABLE 2

| Coating No. | Acrylic resin No. | Amount | Crosslinking agent Type | NCO/OH equivalent ratio | Amount | Curing catalyst Type | Amount |
|---|---|---|---|---|---|---|---|
| (i-1) | (I) | 10 | Takenate | 1.0 | 4.39 | DBTDL | 0.003 |
| (i-2) | (II) | 10 | Duranate | 1.0 | 13.68 | DMDNT | 0.01 |
| (i-3) | (III) | 10 | VETSTANAT | 1.0 | 2.96 | DBTDL | 0.003 |
| (i-4) | (III) | 10 | VETSTANAT | 1.2 | 3.56 | BTEHT | 0.005 |
| (i-5) | (IV) | 10 | Takenate | 1.0 | 5.83 | DBTDL | 0.005 |
| (i-6) | (IV) | 10 | Duranate | 1.0 | 9.36 | DBTDL | 0.005 |
| (i-7) | (V) | 10 | VETSTANAT | 1.2 | 3.00 | BTEHT | 0.01 |
| (i-8) | (V) | 10 | VETSTANAT | 1.0 | 2.50 | DBTDL | 0.005 |
| (i-9) | (I) | 10 | VETSTANAT | 0.8 | 2.66 | DBTDL | 0.001 |
| (i-10) | (I) | 10 | VETSTANAT | 1.2 | 3.99 | DBTDL | 0.003 |
| (i-11) | (I) | 10 | VETSTANAT | 1.2 | 3.99 | HEBAP | 0.01 |
| (i-12) | (III) | 10 | VESTANAT | 1.0 | 2.96 | DMDNT | 0.005 |
| (i-13) | (IV) | 10 | VESTANAT | 1.0 | 4.41 | DBTDL | 0.007 |

| Coating No. | Ultraviolet light absorber Type | Amount | Silane coupling agent Type | Amount | Solvent MIBK | MEK | 2-BuOH | PMA | xylene |
|---|---|---|---|---|---|---|---|---|---|
| (i-1) | UV-1 | 2.88 | | | 33 | 13 | 26 | | |
| (i-2) | UV-2 | 3.64 | | | 64 | | 32 | | |
| (i-3) | UV-1 | 2.59 | | | 42 | | 28 | | |
| (i-4) | UV-1 | 2.71 | | | 32 | | 28 | | 10 |
| (i-5) | UV-2 | 2.85 | | | 56 | | 28 | | |
| (i-6) | UV-1 | 3.12 | | | 50 | 10 | 30 | | |
| (i-7) | UV-1 | 1.95 | | | 24 | 10 | 32 | 10 | |
| (i-8) | UV-1 | 1.88 | | | 42 | | 28 | | |
| (i-9) | UV-1 | 2.52 | | | 46 | | 23 | | |
| (i-10) | UV-1 | 2.80 | | | 50 | | 25 | | |
| (i-11) | UV-1 | 2.80 | | | 50 | | 25 | | |
| (i-12) | UV-3 | 2.00 | APZ-6633 | 1.5 | 50 | | 25 | | |
| (i-13) | UV-4 | 1.50 | APZ-6633 | 1.5 | 50 | | 22 | | |

In Table 2,
(1) MIBK; methyl isobutyl ketone
(2) MEK; methyl ethyl ketone
(3) 2-BuOH; 2-butanol
(4) PMA; 1-methoxy-2-propanol
(5) Takenate; Takenate; polyisocyanate compound precursor of Mitsui Takeda Chemical Co., Ltd., Takenate XB-72-H6
(6) Duranate; polyisocyanate compound precursor of Asahi Chemical Industry Co., Ltd., Duranate MF20-B
(7) VESTANAT; polyisocyanate compound precursor of Degusa Japan Co., Ltd., VESTANAT B1358/100
(8) IPDI; isophorone diisocyanate
(9) DBTDL; dibutyltin dilaurate
(10) DMDNT; dimethyltin dineodecanoate
(11) BTEHT; monobutyltin tris(2-ethylhexanoate)
(12) HEBAP; 2-hydroxyethyl.tri-n-butylammonium 2,2-dimethylpropionate.

The ultraviolet light absorbers used are:
UV-1; 2-(2'-hdyroxy-5'-t-octylphenyl)benzotriazole
UV-2; 2,4-dihydroxybenzophenone
UV-3; Tinubin 411L of Chiba Specialty Chemicals Co., Ltd.
UV-4; CGL777 MPA of Chiba Specialty Chemicals Co., Ltd.

TABLE 3

| Coating No. | Colloidal silica (amount of $SiO_2$) S-30 Amount | Colloidal silica (amount of $SiO_2$) SN-30 Amount | Alkoxysilane Amount of DMDMOS (in terms of $Me_2SiO$) | Alkoxysilane Amount of MTMOS (in terms of $MeSiO_{3/2}$) | Alkoxysilane Amount of TEOS (in terms of $SiO_2$) | Acrylic resin Acrylic resin (IV) |
|---|---|---|---|---|---|---|
| (ii-1) | 30 | | | 64 | | |
| (ii-2) | 30 | | | 60 | | |
| (ii-3) | 18 | | | 64 | | |
| (ii-4) | 30 | | | 66 | | |
| (ii-5) | | 30 | | 64 | | |
| (ii-6) | 30 | | | 66 | 4 | |
| (ii-7) | | 30 | 7 | 67 | | |
| (ii-8) | | 30 | | 64 | | 3 |

In Table 3,
(1) MTMOS; methyltrimethoxysilane
(2) TEOS; tetraethoxysilane
(3) DMDMOS; dimethyldimethoxysilane
(4) S-30; water-dispersible colloidal silica dispersion (Snowtex 30 of Nissan Chemical Industries, Ltd., solid content of 30 wt %, average particle diameter of 20 nm)
(5) SN30; water-dispersible colloidal silica dispersion (Cataloid SN30 of Catalysts & Chemicals Industries Co., Ltd., solid content of 30 wt %, average particle diameter of 10 nm)

The amount of each trialkoxysilane is in terms of $RSiO_{3/2}$ and the amount of each tetraalkoxysilane is in terms of $SiO_2$.

TABLE 4

| No | Storage stability |
|---|---|
| (i-1) | Satisfactory |
| (i-2) | Satisfactory |
| (i-3) | Satisfactory |
| (i-4) | Satisfactory |
| (i-5) | Satisfactory |
| (i-6) | Satisfactory |
| (i-7) | Satisfactory |
| (i-8) | Satisfactory |
| (i-9) | Satisfactory |
| (i-10) | Satisfactory |
| (i-11) | Satisfactory |
| (i-12) | Satisfactory |
| (i-13) | Satisfactory |

TABLE 5

| | First layer No. | First layer Thickness (μm) | Second layer No. | Second layer Thickness (μm) | Appearance | Adhesion | Abrasion resistance ΔH % | Scratch resistance | Hot water resistance 3 hours Appearance | Hot water resistance 3 hours Adhesion | Hot water resistance 10 hours Appearance | Hot water resistance 10 hours Adhesion |
|---|---|---|---|---|---|---|---|---|---|---|---|---|
| Laminate 1 | (i-1) | 4.0 | (ii-1) | 5.0 | satisfactory | 100 | 3.2 | 1 | satisfactory | 100 | satisfactory | 100 |
| Laminate 2 | (i-2) | 4.5 | (ii-2) | 5.0 | satisfactory | 100 | 4 | 1 | satisfactory | 100 | satisfactory | 100 |
| Laminate 3 | (i-3) | 5.0 | (ii-3) | 4.0 | satisfactory | 100 | 4.4 | 1 | satisfactory | 100 | satisfactory | 100 |
| Laminate 4 | (i-4) | 4.0 | (ii-4) | 4.5 | satisfactory | 100 | 3.8 | 1 | satisfactory | 100 | satisfactory | 100 |
| Laminate 5 | (i-5) | 5.0 | (ii-5) | 4.5 | satisfactory | 100 | 3 | 1 | satisfactory | 100 | satisfactory | 100 |
| Laminate 6 | (i-6) | 4.0 | (ii-6) | 4.0 | satisfactory | 100 | 2.9 | 1 | satisfactory | 100 | Crack | 100 |
| Laminate 7 | (i-7) | 3.0 | (ii-1) | 4.0 | satisfactory | 100 | 3.1 | 1 | satisfactory | 100 | satisfactory | 100 |
| Laminate 8 | (i-8) | 3.5 | (ii-2) | 4.0 | satisfactory | 100 | 3.9 | 1 | satisfactory | 100 | satisfactory | 100 |
| Laminate 9 | (i-9) | 4.0 | (ii-2) | 3.5 | satisfactory | 100 | 4 | 1 | satisfactory | 100 | satisfactory | 100 |
| Laminate 10 | (i-10) | 6.0 | (ii-1) | 4.0 | satisfactory | 100 | 3.9 | 1 | satisfactory | 100 | satisfactory | 100 |
| Laminate 11 | (i-11) | 4.5 | (ii-2) | 4.0 | satisfactory | 100 | 4.1 | 1 | satisfactory | 100 | satisfactory | 100 |
| Laminate 12 | (i-12) | 4.0 | (ii-1) | 3.8 | satisfactory | 100 | 3.6 | 1 | satisfactory | 100 | satisfactory | 100 |
| Laminate 13 | (i-12) | 4.5 | (ii-7) | 4.2 | satisfactory | 100 | 6.9 | 1 | satisfactory | 100 | satisfactory | 100 |
| Laminate 14 | (i-1) | 4.0 | (ii-7) | 4.1 | satisfactory | 100 | 6.2 | 1 | satisfactory | 100 | satisfactory | 100 |

TABLE 5-continued

| | | | | | | | | | | | |
|---|---|---|---|---|---|---|---|---|---|---|---|
| Laminate 15 | (i-13) | 4.5 | (ii-1) | 4.3 | satisfactory | 100 | 3.8 | 1 | satisfactory | 100 | satisfactory | 100 |
| Laminate 16 | (i-13) | 4.0 | (ii-7) | 4.0 | satisfactory | 100 | 6.7 | 1 | satisfactory | 100 | satisfactory | 100 |
| Laminate 17 | (i-13) | 4.0 | (ii-8) | 4.0 | satisfactory | 100 | 5.5 | 1 | satisfactory | 100 | satisfactory | 100 |
| Laminate 18 | (i-4) | 4.0 | (ii-4) | 4.0 | satisfactory | 100 | When it was used in an actual car, it had no defect which causes a problem in practical use. |

| | Environmental resistance cycle test | | High-temperature environment durability | | Moist heat resistance | | Weatherability | | | |
|---|---|---|---|---|---|---|---|---|---|---|
| | | | | | | | 2,000 hours | | 2,500 hours | |
| | Apperance | Adhesion | Appearance | Adhesion | Appearance | Adhesion | Adhesion | Yellow index | Adhesion | Yellow index |
| Laminate 1 | satisfactory | 100 | satisfactory | 100 | satisfactory | 100 | 100 | 0.9 | 50 | 2.4 |
| Laminate 2 | satisfactory | 100 | satisfactory | 100 | satisfactory | 100 | 100 | 1.1 | 40 | 2.8 |
| Laminate 3 | satisfactory | 100 | satisfactory | 100 | satisfactory | 100 | 100 | 1.2 | 20 | 3.1 |
| Laminate 4 | satisfactory | 100 | satisfactory | 100 | satisfactory | 100 | 100 | 1.2 | 50 | 2.8 |
| Laminate 5 | satisfactory | 100 | satisfactory | 100 | satisfactory | 100 | 100 | 0.8 | 50 | 2.5 |
| Laminate 6 | satisfactory | 100 | satisfactory | 100 | satisfactory | 100 | 100 | 0.9 | 0 | 2.2 |
| Laminate 7 | satisfactory | 100 | satisfactory | 100 | satisfactory | 100 | 100 | 1.3 | 20 | 1.8 |
| Laminate 8 | satisfactory | 100 | satisfactory | 100 | satisfactory | 100 | 100 | 1.4 | 20 | 1.9 |
| Laminate 9 | satisfactory | 100 | satisfactory | 100 | satisfactory | 100 | 100 | 1.1 | 50 | 3.1 |
| Laminate 10 | satisfactory | 100 | satisfactory | 100 | satisfactory | 100 | 100 | 1.2 | 50 | 2.8 |
| Laminate 11 | satisfactory | 100 | satisfactory | 100 | satisfactory | 100 | 100 | 1.1 | 50 | 2.1 |
| Laminate 12 | satisfactory | 100 | satisfactory | 100 | satisfactory | 100 | 100 | 0.8 | 90 | 1.1 |
| Laminate 13 | satisfactory | 100 | satisfactory | 100 | satisfactory | 100 | 100 | 0.6 | 100 | 0.9 |
| Laminate 14 | satisfactory | 100 | satisfactory | 100 | satisfactory | 100 | 100 | 0.9 | 80 | 2.5 |
| Laminate 15 | satisfactory | 100 | satisfactory | 100 | satisfactory | 100 | 100 | 0.5 | 90 | 0.7 |
| Laminate 16 | satisfactory | 100 | satisfactory | 100 | satisfactory | 100 | 100 | 0.6 | 100 | 0.9 |
| Laminate 17 | satisfactory | 100 | satisfactory | 100 | satisfactory | 100 | 100 | 0.6 | 100 | 0.9 |
| Laminate 18 | When it was used in an actual car, it had no defect which causes a problem in practical use. |

Examples 6 and 7

In the following examples, the obtained laminates were evaluated by the following method. "Parts" in the examples means "parts by weight".

(1) Evaluation of appearance: The appearance (existence of foreign matter, cissing and mottling) and the existence of a crack of the coating layer on both sides of the test sample were visually checked.
(2) Adhesion: One of the coating layers on both sides was cut with a cutter knife at intervals of 1 mm to form 100 squares, the adhesive tape of Nichiban Co., Ltd. (trade name: Cellotape) was affixed to the cut coating layer by pressure and strongly stripped off at a right angle, and the remaining squares on the substrate were counted. Adhesion was evaluated based on the count of the remaining squares (JIS K5400).
(3) Scratch resistance: After one of the coating layers on both sides was rubbed with #0000 steel wool, the surface state of the coating layer was visually checked to evaluate its scratch resistance based on the following five criteria.

1: not scratched at all after rubbing strongly

2: slightly scratched after rubbing strongly

3: somewhat scratched after rubbing strongly

4: scratched after rubbing strongly

5: scratched after rubbing gently (4) Abrasion resistance: A Taber abrasion test was made on one of the coating layers on both sides by turning the CS-10F truck wheel of Calibrase Co. Ltd. 1,000 times under a load of 500 g to measure a haze difference ΔH before and after the Taber abrasion test (based on ASTM D1044). (haze=Td/Tt×100, Td: scattered light transmittance, Tt: total light transmittance)

(5) Hot water resistance: The test sample was immersed in boiling water for 2 hours to evaluate a change in the appearance and the adhesion of the coating layer.

Example 6

<Preparation of Acrylic Resin (G-1)>

80.1 parts of methyl methacrylate (to be abbreviated as MMA hereinafter), 13 parts of 2-hydroxyethyl methacrylate (to be abbreviated as HEMA hereinafter), 0.14 part of azobisisobutyronitrile (to be abbreviated as AIBN hereinafter) and 200 parts of 1,2-dimethoxyethane were added to a flask equipped with a reflux condenser and stirrer whose inside had been substituted with nitrogen to be mixed and dissolved together. Thereafter, a reaction was carried out at 70° C. in a stream of nitrogen for 6 hours under agitation. The obtained reaction solution was added to n-hexane and purified by re-precipitation to obtain 80 parts of a copolymer (acrylic resin (G-1)) having an MMA/HEMA ratio of 90/10 (molar ratio).

<Preparation of Acrylic Resin Composition (g-1)>

8.9 parts of the acrylic resin (G-1) and 1.5 parts of 2-(2'-hydroxy-5'-t-octylphenyl)benzotriazole were dissolved in a mixed solvent of 20 parts of methyl ethyl ketone, 30 parts of methyl isobutyl ketone and 30 parts of 2-propanol, and further 1.1 parts of hexamethylene diisocyanate was added to this solution to ensure that the amount of the isocyanate group became 1.5 equivalents based on 1 equivalent of the hydroxy group of the above acrylic resin (G-1) and stirred at 25° C. for 5 minutes to prepare an acrylic resin composition (g-1).

<Preparation of Organosiloxane Resin Composition (h-1)>

80 parts of a water-dispersible colloidal silica dispersion (Cataloid SN-35 of Catalysts & Chemicals Industries Co., Ltd., solid content of 30 wt %) was added to 127 parts of methyltrimethoxysilane under cooling with iced water. This mixed solution was stirred at 25° C. for 1.5 hours and at 70° C. for 2 hours, and the obtained reaction solution was cooled with iced water and mixed with 24 parts of acetic acid and 2 parts of sodium acetate as a curing catalyst under cooling with iced water to prepare an organosiloxane resin composition (h-1).

The silicon nuclear magnetic resonance spectrum ($^{29}$Si-NMR) of the organosiloxane resin composition (h-1) was measured at a measurement frequency of 79 MHz, a measurement pulse of 6.0 μs, a repetition time of 30 seconds and a broadening factor of 5 Hz using deuterium oxide ($D_2O$) as a measurement solvent. The silicon nuclear magnetic resonance spectrum ($^{29}$Si-NMR) of the coating agent was measured under the same conditions in the following examples. The chemical shifts of the silicon atoms of the organosiloxane resin composition satisfied the following expressions:

$$[X]/[S]=0.010 \text{ and } [Y]/[Z]=0.96$$

wherein [S] is the integrated value of all the peaks at a range from −46.5 ppm to −70.0 ppm, [X] is the integrated value of all the peaks at a range from −46.5 ppm to −48.5 ppm, [Y] is the integrated value of all the peaks at a range from −52.5 ppm to −61.0 ppm, and [Z] is the integrated value of all the peaks at a range from −61.0 ppm to −70.0 ppm when the peak of the silicon atom of tetramethylsilane is at 0 ppm.

<Manufacture Of Laminate>

The acrylic resin composition (g-1) was applied to both sides of a 2 mm-thick transparent polycarbonate sheet by dip coating to a film thickness of 4 μm after curing and thermally cured at 120° C. for 1 hour, and then the organosiloxane resin composition (h-1) was applied to both sides of the polycarbonate sheet by dip coating to a film thickness of 5 μm after curing and thermally cured at 120° C. for 1 hour to obtain a laminate 19. The evaluation results of the laminate 19 are shown in Table 6.

Example 7

<Preparation of Organosiloxane Resin Composition (h-2)>

12 parts of acetic acid was added to 80 parts of a water-dispersible colloidal silica dispersion (Cataloid SN-35 of Catalysts & Chemicals Industries Co., Ltd., solid content of 30 wt %) and stirred, and 127 parts of methyltrimethoxysilane was added to this resulting dispersion under cooling with iced water. This mixed solution was stirred at 30° C. for 1.5 hours and at 70° C. for 4 hours, and the obtained reaction solution was cooled with iced water and mixed with 2 parts of sodium acetate as a curing catalyst under cooling with iced water to prepare an organosiloxane resin composition (h-2).

When the silicon nuclear magnetic resonance spectrum of the organosiloxane resin composition (h-2) was measured, the integrated values of the peaks satisfied [X]/[S]=0.006 and [Y]/[Z]=0.82.

The acrylic resin composition (g-1) was applied to both sides of a 2 mm-thick transparent polycarbonate sheet by dip coating to a film thickness of 4 μm after curing and thermally cured at 120° C. for 1 hour, and the organosiloxane resin composition (h-2) was applied to both sides of the polycarbonate sheet by dip coating to a film thickness of 5 μm after curing and thermally cured at 120° C. for 1 hour to obtain a laminate 20 having these coating layers. The evaluation results of the obtained laminate 20 are shown in Table 6.

TABLE 6

| | | Second layer | | | | | Evaluation results | | | | | |
| | | First layer | [X]/[S] | [X]/[Z] | Appearance | | | Ad-hesion | Scratch resistance | Abrasion resistance | Heat resistance | |
| Ex. No. | Laminate No. | | | | Cissing | Cracking | Others | | | | Appearance | Adhesion |
| Ex. 6 | Laminate 19 | g-1 | 0.010 | 0.960 | Satisfactory | Satisfactory | Satisfactory | 100 | 1 | 4.1 | Satisfactory | 100 |
| Ex. 7 | Laminate 20 | g-1 | 0.006 | 0.820 | Satisfactory | Satisfactory | Satisfactory | 100 | 1 | 4.7 | Satisfactory | 100 |

Ex. = Example

Examples 8 to 13

(1) measurement of concentration of compound having ultraviolet light absorptivity Before Examples and Comparative Examples were carried out, the composition for the first layer comprising a described compound having ultraviolet light absorptivity whose content ($c_0$: g/cm$^3$ in unit) was known was applied to the 5.0 mm-thick transparent polycarbonate resin board of Teijin Chemicals Ltd. (PC-1151: containing no ultraviolet light absorber) by dip coating to a film thickness described in each Example and left at room temperature for 20 minutes to measure its absorbance at 380 nm ($I_1$) (before curing).

The coating film was thermally cured at 130° C. for 1 hour to measure its absorbance at 380 nm again at the same spot as the measurement spot before curing ($I_2$). The concentration (c) of the compound having ultraviolet light absorptivity contained in the coating film was calculated from these values based on the following equation (f):

$$c = c_0 \times (I_2/I_1) \tag{f}$$

The measurement values $I_1$ and $I_2$ were corrected by measuring the absorbance at 380 nm of the PC-1151 alone separately.

(2) Evaluation of appearance: The appearance (existence of foreign matter) and the existence of a crack of the coating layer on one side of the test sample were visually checked.

(3) Adhesion: One of the coating layers on both sides was cut with a cutter knife at intervals of 1 mm to form 100 squares, the adhesive tape of Nichiban Co., Ltd. (trade name: Cellotape) was affixed to the cut coating layer by pressure and strongly stripped off at a right angle, and the remaining squares on the substrate were counted. Adhesion was evaluated based on the count of the remaining squares (JIS K5400).

(4) Abrasion resistance: A Taber abrasion test was made on one of the coating layers on both sides by turning the CS-10F truck wheel of Calibrase Co. Ltd. 1,000 times under a load of 500 g in accordance with JIS K6735 to measure a haze difference $\Delta H$ before and after the Taber abrasion test. The truck wheel was refaced with the S-11 abrasive paper in place of the AA-400 abrasive paper by turning it 25 times. (haze=Td/Tt×100, Td: scattered light transmittance, Tt: total light transmittance)

(5) Acceleration test: An exposure test was made on the test sample for 1,500 hours at a UV radiation strength of 180 W/m$^2$ and a black panel temperature of 63° C. while it was exposed to 18 minutes of rainfall every 120 minutes, using the SX-75 super xenon weather meter of Suga Shikenki Co., Ltd. without changing the UV exposed surface. The test sample was taken out to evaluate the appearance and yellow index ($\Delta YI$) of the UV exposed surface.

(6) Actual exposure test: The test sample was placed at 45° C. from the horizontal plane, facing south, subjected to an actual exposure test for 5 years without changing the exposed surface and taken out to evaluate the appearance and yellow index ($\Delta YI$) of the exposed surface.

Reference Example 6

Synthesis of Acrylic Resin (J-1)

80.1 parts of methyl methacrylate (to be abbreviated as MMA hereinafter), 13 parts of 2-hydroxyethyl methacrylate (to be abbreviated as HEMA hereinafter), 0.14 part of azobisisobutyronitrile (to be abbreviated as AIBN hereinafter) and 200 parts of 1,2-dimethoxyethane were added to a flask equipped with a reflux condenser and stirrer whose inside had been substituted with nitrogen to be mixed and dissolved together. Thereafter, a reaction was carried out at 70° C. in a stream of nitrogen for 6 hours under agitation. The obtained reaction solution was added to n-hexane and purified by re-precipitation to obtain 80 parts of an acrylic resin (J-1).

Reference Example 7

Synthesis of Acrylic Resin (J-2)

91.3 parts of ethyl methacrylate (to be abbreviated as EMA hereinafter), 19.5 parts of HEMA, 16.2 parts of 2-(2'-hydroxy-5'-methacryloxyethylphenyl)benzotriazole (to be abbreviated as MEBT hereinafter, absorbance of 0.43 at a wavelength of 300 nm when measured in a chloroform solution having a concentration of 10 mg/L at an optical path length of 1.0 cm), 0.25 part of AIBN, 100 parts of methyl isobutyl ketone and 50 parts of 2-butanol were added to a flask equipped with a reflux condenser and stirrer whose inside had been substituted with nitrogen to be mixed and dissolved together. Thereafter, a reaction was carried out at 70° C. in a stream of nitrogen for 6 hours under agitation. The obtained reaction solution was added to n-hexane and purified by re-precipitation to obtain 100 parts of an acrylic resin (J-2).

Reference Example 8

Synthesis of Acrylic Resin (J-3)

91.3 parts of EMA, 19.5 parts of HEMA, 15 parts of UVA-ST1 polymeric ultraviolet light absorber of BASF Co., Ltd., absorbance of 0.21 at a wavelength of 300 nm when measured in a chloroform solution having a concentration of 10 mg/L at an optical path length of 1.0 cm), 0.25 part of AIBN, 100 parts of methyl isobutyl ketone and 50 parts of 2-butanol were added to a flask equipped with a reflux condenser and stirrer whose inside had been substituted with nitrogen to be mixed and dissolved together. Thereafter, a reaction was carried out at 70° C. in a stream of nitrogen for 6 hours under agitation. The obtained reaction solution was added to n-hexane and purified by re-precipitation to obtain 100 parts of an acrylic resin (J-3).

Example 8

<Preparation of Organosiloxane Resin Composition (t-1)>

2 parts of distilled water and 20 parts of acetic acid were added to 100 parts of a water-dispersible colloidal silica dispersion (Snowtex 30 of Nissan Chemical Industries, Ltd., solid content of 30 wt %) and stirred, and 130 parts of methyltrimethoxysilane was added to this dispersion under cooling with iced water. This mixed solution was stirred at 25° C. for 1 hour, and the obtained reaction solution was mixed with 2 parts of sodium acetate as a curing catalyst under cooling with iced water and diluted with 200 parts of isopropanol to prepare an organosiloxane resin composition (t-1).

Example 9

Manufacture of Laminate 21

<Preparation of Acrylic Resin Composition (J-1)>

8.9 parts of the above acrylic resin (J-1) and 4.0 parts of 2-(2'-hydroxy-5'-t-octylphenyl)benzotriazole (absorbance of 0.45 at a wavelength of 300 nm when measured in a chloroform solution having a concentration of 10 mg/L at an optical path length of 1.0 cm) were dissolved in a mixed solvent of 20 parts of methyl ethyl ketone, 30 parts of methyl isobutyl ketone and 30 parts of 2-propanol, and 1.1 parts of hexamethylene diisocyanate was added to this solution to ensure that the amount of the isocyanate group became 1.5 equivalents based on 1 equivalent of the hydroxy group of the acrylic resin (J-1) and stirred at 25° C. for 5 minutes to prepare an acrylic resin composition (j-1).

This acrylic resin composition (j-1) was applied to 5 mm-thick PC-1151 by dip coating, left at 25° C. for 20 minutes and thermally cured at 130° C. for 1 hour. This first layer had a thickness of 3.2 μm, and the concentration of 2-(2'-hydroxy-5'-t-octyphenyl)benzotriazole remaining in the film was 0.20 g/cm$^3$.

Further, the organosiloxane resin composition (t-1) was applied by dip coating, left at 25° C. for 20 minutes and thermally cured at 120° C. for 1 hour. The second layer had a thickness of 5.1 µm. The evaluation results of the obtained laminate 21 are shown in Table 7. ε in Table 7 indicates the absorbance at a wavelength of 300 nm of the compound having ultraviolet light absorptivity when measured in a chloroform solution having a concentration of 10 mg/L at an optical path length of 1.0 cm.

Example 10

Manufacture of Laminate 22

<Preparation of Acrylic Resin Composition (j-2)>

An acrylic resin composition (j-2) was prepared in the same manner as in Example 9 except that the compound having ultraviolet light absorptivity of Example 9 was changed to 6.7 parts of 2-(2'-hydroxy-5'-t-octylphenyl)benzotriazole.

This acrylic resin composition (j-2) was applied to 5 mm-thick PC-1151 by dip coating, left at 25° C. for 20 minutes and thermally cured at 130° C. for 1 hour. The first layer had a thickness of 7.2 µm and the concentration of 2-(2'-hydroxy-5'-t-octylphenyl)benzotriazole remaining in the film was 0.40 g/cm$^3$.

Further, the organosiloxane resin composition (t-1) was applied by dip coating, left at 25° C. for 20 minutes and thermally cured at 120° C. for 1 hour. The second layer had a thickness of 5.1 µm. The evaluation results of the obtained laminate 22 are shown in Table 7.

Example 11

Manufacture of Laminate 23

<Preparation of Acrylic Resin Composition (j-3)>

An acrylic resin composition (j-3) was prepared in the same manner as in Example 9 except that the compound having ultraviolet light absorptivity of Example 9 was changed to 3.0 parts of 2-(2'-hydroxy-5'-t-octylphenyl)benzotriazole and 1.6 parts of 2-(2H-benzotriazol-2-yl)-4,6-bis(1-methyl-1-phenylethyl)phenol (absorbance of 0.38 at a wavelength of 300 nm when measured in a chloroform solution having a concentration of 10 mg/L at an optical path length of 1.0 cm).

This acrylic resin composition was applied to 5 mm-thick PC-1151 by dip coating, left at 25° C. for 20 minutes and thermally cured at 130° C. for 1 hour. The first layer had a thickness of 2.3 µm, and the concentration of 2-(2'-hydroxy-5'-t-octylphenyl)benzotriazole remaining in the film was 0.13 g/cm$^3$ and the concentration of 2-(2H-benzotriazol-2-yl)-4,6-bis(1-methyl-1-phenylethyl)phenol remaining in the film was 0.16 g/cm$^3$.

Further, the organosiloxane resin composition (t-1) was applied by dip coating, left at 25° C. for 20 minutes and thermally cured at 120° C. for 1 hour. The second layer had a thickness of 4.9 µm. The evaluation results of the obtained laminate 23 are shown in Table 7.

Example 12

Manufacture of Laminate 24

<Preparation of Acrylic Resin Composition (j-4)>

10.0 parts of the above acrylic resin (j-2) was dissolved in a mixed solvent of 50 parts of methyl isobutyl ketone and 30 parts of 2-butanol, 4.04 parts of VESTANAT B1358/100 (adduct type polyisocyanate compound precursor of Degusa Japan Co., Ltd.) was added to this solution to ensure that the amount of the isocyanate group became 1.0 equivalent based on 1 equivalent of the hydroxy group of the above acrylic resin (J-2), and further 0.001 part of monobutyltin tris(2-ethylhexanoate) was added and stirred at 25° C. for 30 minutes to prepare an acrylic resin composition (j-4).

This acrylic resin composition (j-4) was applied to 5 mm-thick PC-1151 by dip coating, left at 25° C. for 20 minutes and thermally cured at 130° C. for 1 hour. The first layer had a thickness of 6.0 µm and the concentration of 2-(2'-hydroxy-5'-methacryloxyethylphenyl)benzotriazole remaining in the film was 0.11 g/cm$^3$.

Further, the organosiloxane resin composition (t-1) was applied by dip coating, left at 25° C. for 20 minutes and thermally cured at 120° C. for 1 hour. The second layer had a thickness of 4.9 µm. The evaluation results of the obtained laminate 24 are shown in Table 7.

Example 13

Manufacture of Laminate 25

<Preparation of Acrylic Resin Composition (j-5)>

An acrylic resin composition (j-5) was prepared in the same manner as in Example 12 except that 3.0 parts of 2-(2'-hydroxy-5'-t-octylphenyl)benzotriazole which is a compound having an ultraviolet light absorbing group was added to the acrylic resin composition (j-4) of Example 12.

This acrylic resin composition (j-5) was applied to 5 mm-thick PC-1151 by dip coating, left at 25° C. for 20 minutes and thermally cured at 130° C. for 1 hour. The first layer had a thickness of 3.5 µm and the concentration of 2-(2'-hydroxy-5'-methacryloxyethylphenyl)benzotriazole remaining in the film was 0.11 g/cm$^3$ and the concentration of 2-(2'-hydroxy-5'-t-octylphenyl)benzotriazole remaining in the film was 0.13 g/cm$^3$.

Further, the organosiloxane resin composition (t-1) was applied by dip coating, left at 25° C. for 20 minutes and thermally cured at 120° C. for 1 hour. The second layer had a thickness of 4.2 µm. The evaluation results of the obtained laminate 25 are shown in Table 7.

TABLE 7

| | | Compound having ultraviolet light absorptivity | | First layer | | |
|---|---|---|---|---|---|---|
| Ex. No. | Laminate No. | Name of compound | ε | d(µm) | c(g/cm$^3$) | d × c |
| Ex. 9 | Laminate 21 | 2-(2'-hydroxy-5'-t-octylphenyl)benzotriazole | 0.45 | 3.2 | 0.20 | 0.64 |
| Ex. 10 | Laminate 22 | 2-(2'-hydroxy-5'-t-octylphenyl)benzotriazole | 0.45 | 7.2 | 0.40 | 2.88 |

TABLE 7-continued

| Ex. 11 | Laminate 23 | 2-(2'-hydroxy-5'-t-octylphenyl)benzotriazole | 0.45 | 2.3 | 0.13 | 0.67 |
|--------|-------------|---------------------------------------------|------|-----|------|------|
|        |             | 2-(2H-benzotriazol-2-yl)-4,6-bis(1-methyl-1-phenylethyl)phenol | 0.38 |     | 0.16 |      |
| Ex. 12 | Laminate 24 | 2-(2'-hydroxy-5'-methacryloxyphenyl)benzotriazole | 0.43 | 6.0 | 0.11 | 0.66 |
| Ex. 13 | Laminate 25 | 2-(2'-hydroxy-5'-methacryloxyphenyl)benzotriazole | 0.43 | 3.5 | 0.11 | 0.84 |
|        |             | 2-(2'-hydroxy-5'-t-octylphenyl)benzotriazole | 0.45 |     | 0.13 |      |

| | | Evaluation of performance | | | | | |
|---|---|---|---|---|---|---|---|
| | | | | | Acceleration test | | Actual exposure test | |
| Ex. No. | Laminate No. | Appearance | Adhesion | Abrasion resistance | Appearance | ΔY1 | Appearance | ΔY1 |
| Ex. 9 | Laminate 21 | ○ | 100 | 3.2 | ○ | 1.1 | ○ | 2.0 |
| Ex. 10 | Laminate 22 | ○ | 100 | 4.2 | ○ | 0.8 | ○ | 1.5 |
| Ex. 11 | Laminate 23 | ○ | 100 | 3.4 | ○ | 1.0 | ○ | 1.3 |
| Ex. 12 | Laminate 24 | ○ | 100 | 3.8 | ○ | 0.9 | ○ | 2.0 |
| Ex. 13 | Laminate 25 | ○ | 100 | 3.6 | ○ | 0.4 | ○ | 0.8 |

Ex. = Example

Example 14

<Preparation of Acrylic Resin Composition (s-1)>

10.0 parts of the above acrylic resin (I) and 3.00 parts of 2-(2'-hydroxy-5'-t-octylphenyl)benzotriazole were dissolved in a mixed solvent of 52 parts of methyl isobutyl ketone and 26 parts of 2-butanol, 4.99 parts of VESTANAT B1358/100 (block isocyanate of Degusa Japan Co., Ltd.) was added to this solution to ensure that the amount of the isocyanate group became 1.5 equivalents based on 1 equivalent of the hydroxy group of the above acrylic resin (I), and further 1.00 part of APZ-6633 (hydrolysis and condensation product of the amino group-containing silane coupling agent of Nippon Unicar Co., Ltd.) was added and stirred at 25° C. for 30 minutes to prepare an acrylic resin composition (s-1). The composition of the obtained acrylic resin composition (s-1) is shown in Table 8.

(Manufacture of Laminate 26)

The acrylic resin composition (s-1) was applied to both sides of a 5 mm-thick PC resin sheet by dip coating to a film thickness of 4.0 μm after thermal curing, left at 25° C. for 20 minutes and thermally cured at 130° C. for 1 hour. The organosiloxane resin composition (ii-1) was applied to the coating films of the sheet by dip coating to a film thickness of 5.0 μm after thermal curing, left at 25° C. for 20 minutes and thermally cured at 120° C. for 1 hour. The evaluation results of the obtained laminate 26 are shown in Table 9. The evaluations were made by the same methods as in Example 4.

Example 15

<Preparation of Acrylic Resin Composition (s-4)>

10.0 parts of the above acrylic resin (III) and 2.22 parts of 2-(2'-hydroxy-5'-t-octylphenyl)benzotriazole were dissolved in a mixed solvent of 40 parts of methyl isobutyl ketone and 20 parts of 2-butanol, 1.09 parts of hexamethylene diisocyanate was added to this solution to ensure that the amount of the isocyanate group became 1.5 equivalents based on 1 equivalent of the hydroxy group of the above acrylic resin (III), and further 0.1 part of KBM403 (silane coupling agent of Shin-Etsu Silicone Co., Ltd.) was added and stirred at 25° C. for 30 minutes to prepare an acrylic resin composition (s-4). The composition of the obtained acrylic resin composition (s-4) is shown in Table 8.

<Manufacture of Laminate 27>

The acrylic resin composition (s-4) was applied to both sides of a 5 mm-thick PC resin sheet by dip coating to a film thickness of 4.0 μm after thermal curing, left at 25° C. for 20 minutes and thermally cured at 130° C. for 1 hour. The organosiloxane resin composition (ii-4) was applied to the coating layers of the sheet by dip coating to a film thickness of 5.0 μm after thermal curing, left at 25° C. for 20 minutes and thermally cured at 120° C. for 1 hour. The evaluation results of the obtained laminate 27 are shown in Table 9. The evaluations were made by the same methods as in Example 4.

TABLE 8

| | Acrylic resin | | Crosslinking agent | | | Silane coupling agent | |
|---|---|---|---|---|---|---|---|
| Coating No. | No. | Amount | Type | NCO/OH equivalent ratio | Amount | Type | Amount |
| s-1 | (I) | 10 | VESTANAT | 1.5 | 4.99 | APZ-6633 | 1 |
| s-4 | (III) | 10 | HDI | 1.5 | 1.09 | KBM403 | 0.1 |

| | Ultraviolet light absorber | | Solvent | | | | |
|---|---|---|---|---|---|---|---|
| Coating No. | Type | Amount | MIBK | MEK | 2-BuOH | PMA | Xylene |
| s-1 | UV-1 | 3.00 | 52 | — | 26 | — | — |
| s-4 | UV-1 | 2.22 | 40 | — | 20 | — | — |

TABLE 9

| Ex. No. | Laminate No. | First layer No. | First layer Film thickness (μm) | Second layer No. | Second layer Film thickness (μm) | Appearance | Adhesion |
|---|---|---|---|---|---|---|---|
| Ex. 14 | Laminate 26 | (s-1) | 4.0 | (ii-1) | 5.0 | Satisfactory | 100 |
| Ex. 15 | Laminate 27 | (s-4) | 4.0 | (ii-4) | 4.5 | Satisfactory | 100 |

| | Abrasion resistance | | Hot water resistance | | | | Environmental resistance | |
| | | | 3 hours | | 10 hours | | cycle test | |
| Ex. No. | ΔH(%) | Scratch resistance | Appearance | Adhesion | Appearance | Adhesion | Appearance | Adhesion |
| Ex. 14 | 3.2 | 1 | Satisfactory | 100 | Satisfactory | 100 | Satisfactory | 100 |
| Ex. 15 | 3.9 | 1 | Satisfactory | 100 | Satisfactory | 100 | Satisfactory | 100 |

| | High temperature environment durability | | Moist heat resistance | | weatherability | | | |
| | | | | | 2,000 hours | | 2,500 hours | |
| Ex. No. | Appearance | Adhesion | Appearance | Adhesion | Adhesion | Yellow index | Adhesion | Yellow index |
| Ex. 14 | Satisfactory | 100 | Satisfactory | 100 | 100 | 0.9 | 100 | 1.8 |
| Ex. 15 | Satisfactory | 100 | Satisfactory | 100 | 100 | 1.1 | 100 | 2.3 |

Ex. = Example

EFFECT OF THE INVENTION

According to the present invention, there is provided a laminate which is excellent in appearance, adhesion, scratch resistance, abrasion resistance and hot water resistance and has a high level of weatherability and excellent durability against environmental variations and a high-temperature environment.

According to the present invention, there are also provided an acrylic resin composition and an organosiloxane resin composition both of which can be used for the manufacture of the above laminate and have excellent storage stability.

INDUSTRIAL FEASIBILITY

The laminate of the present invention can be advantageously used in car window glass and sunroofs, making use of its transparency.

The invention claimed is:

1. A laminate comprising a polycarbonate substrate, a first layer formed on the surface of the polycarbonate substrate, and a second layer formed on the surface of the first layer, wherein
the first layer is formed by applying an acrylic resin composition comprising components (A) to (E) to the surface of the polycarbonate substrate and curing it, and the second layer is formed by applying an organosiloxane resin composition comprising components (a) to (d) to the surface of the first layer and curing it;
the component (A) is an acrylic copolymer which comprises 50 mol % or more of a recurring unit represented by the following formula (A-1):

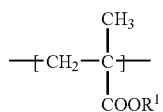

(A-1)

wherein $R^1$ is a methyl group or ethyl group, 5 to 30 mol % of a recurring unit represented by the following formula (A-4):

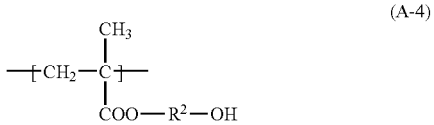

(A-4)

wherein $R^2$ is an alkylene group having 2 to 5 carbon atoms, and 0 to 30 mol % of a recurring unit represented by the following formula (A-3):

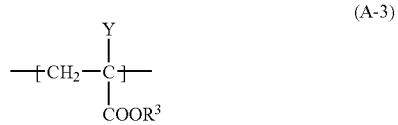

(A-3)

wherein Y is a hydrogen atom or methyl group, $R^3$ is at least one group selected from the group consisting of hydrogen atom, alkyl group having 2 to 5 carbon atoms and ultraviolet light absorbing residue, with the proviso that a case where Y is a methyl group and $R^3$ is a methyl group or ethyl group is excluded;

the component (B) is a polyisocyanate compound and/or a blocked polyisocyanate compound having an isocyanate group content of 0.7 to 5 equivalents based on 1 equivalent of the hydroxy group of the component (A);

the component (C) is a curing catalyst which is contained in an amount of 0 to 0.4 part by weight based on 100 parts by weight of the total of the components (A) and (B);

the component (D) is an ultraviolet light absorber which is contained in an amount of 10 to 50 parts by weight based on 100 parts by weight of the total of the component (A) and (B);

the component (E) is a silane coupling agent which is contained in an amount of 0 to 5 parts by weight based on 100 parts by weight of the total of the components (A) and (B);

the component (a) is colloidal silica;

the component (b) is a hydrolysate(s) and/or condensate(s) of alkoxysilanes represented by the following formulas (b-1) to (b-3);

  (b-1)

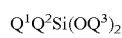  (b-2)

  (b-3)

wherein $Q^1$ and $Q^2$ are each an alkyl group having 1 to 4 carbon atoms, vinyl group or alkyl group having 1 to 3 carbon atoms substituted by at least one group selected from the group consisting of methacryloxy group, amino group, glycidoxy group and 3,4-epoxycyclohexyl group, and $Q^3$ is an alkyl group having 1 to 4 carbon atoms, the (b-1)/(b-2)/(b-3) molar ratio of the above components being 80-100/0-20/0-20;

the component (c) is a curing catalyst;

the component (d) is a solvent; and the molar ratio of Si derived from the component (a) to Si derived from the component (b) ($Si^a/Si^b$) is 2/8 to 4/6.

2. The laminate of claim 1, wherein the component (B) is a blocked polyisocyanate compound.

3. The laminate of claim 1, wherein the component (C) is an organic tin compound represented by the following formula and contained in an amount of 0.01 to 0.4 part by weight based on 100 parts by weight of the total of the components (A) and (B):

wherein $R^x$'s may be the same or different and each a hydrocarbon group having 1 to 8 carbon atoms, $R^y$'s may be the same or different and each a substituted or nonsubstituted hydrocarbon group having 1 to 17 carbon atoms, and m is an integer of 0 to 3.

4. The laminate of claim 1, wherein the component (A) is an acrylic copolymer which comprises 70 to 95 mol % of the recurring unit represented by the formula (A-1) and 5 to 30 mol % of the recurring unit represented by the formula (A-4).

5. The laminate of claim 1, wherein $R^1$ in the formula (A-1) is an ethyl group and $R^2$ in the formula (A-4) is an ethylene group in the component (A).

6. A window material formed from the laminate of claim 1.

7. An acrylic resin composition comprising components (A) to (E), wherein the component (A) is an acrylic copolymer which comprises 50 mol % or more of a recurring unit represented by the following formula (A-1):

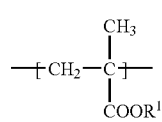  (A-1)

wherein $R^1$ is a methyl group or ethyl group, 5 to 30 mol % of a recurring unit represented by the following formula (A-4):

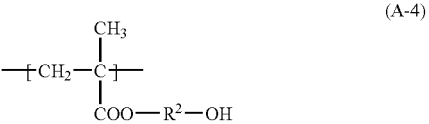  (A-4)

wherein $R^2$ is an alkylene group having 2 to 5 carbon atoms, and 0 to 30 mol % of a recurring unit represented by the following formula (A-3):

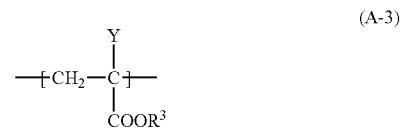  (A-3)

wherein Y is a hydrogen atom or methyl group, and $R^3$ is at least one group selected from the group consisting of hydrogen atom, alkyl group having 2 to 5 carbon atoms and ultraviolet light absorbing residue, with the proviso that a case where Y is a methyl group and $R^3$ is a methyl group or ethyl group is excluded;

the component (B) is a polyisocyanate compound and/or a blocked polyisocyanate compound having an isocyanate group content of 0.7 to 5 equivalents based on 1 equivalent of the hydroxy group of the component (A);

the component (C) is a curing catalyst which is contained in an amount of 0 to 0.4 part by weight based on 100 parts by weight of the total of the components (A) and (B);

the component (D) is an ultraviolet light absorber which is contained in an amount of 10 to 50 parts by weight based on 100 parts by weight of the total of the components (A) and (B); and the component (E) is a silane coupling agent which is contained in an amount of 0 to 5 parts by weight based on 100 parts by weight of the total of the components (A) and (B).

8. The acrylic resin composition of claim 7, wherein the component (B) is a blocked polyisocyanate compound.

9. The acrylic resin composition of claim 7, wherein the component (C) is an organic tin compound and contained in an amount of 0.01 to 0.4 part by weight based on 100 parts by weight of the total of the components (A) and (B).

10. The acrylic resin composition of claim 7, wherein the component (A) is an acrylic copolymer which comprises 70 to 95 mol % of the recurring unit represented by the formula (A-1) and 5 to 30 mol % of the recurring unit represented by the formula (A-4).

11. The acrylic resin composition of claim 7, wherein $R^1$ in the formula (A-1) is an ethyl group and $R^2$ in the formula (A-4) is an ethylene group in the component (A).

12. The acrylic resin composition of claim 7, wherein the component (C) is an organic tin compound represented by the following formula:

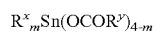

wherein $R^x$'s may be the same or different and each a hydrocarbon group having 1 to 8 carbon atoms, $R^y$'s may be the same or different and each a substituted or nonsubstituted hydrocarbon group having 1 to 17 carbon atoms, and m is an integer of 0 to 3.

13. An organosiloxane resin composition comprising components (a) to (e), wherein
the component (a) is colloidal silica;
the component (b) is a hydrolysate(s) and/or condensate(s) of alkoxysilanes represented by the following formulas (b-1) to (b-3):

$Q^1Si(OQ^3)_3$ (b-1)

$Q^1Q^2Si(OQ^3)_2$ (b-2)

$Si(OQ^3)_4$ (b-3)

wherein $Q^1$ and $Q^2$ are each an alkyl group having 1 to 4 carbon atoms, vinyl group or alkyl group having 1 to 3 carbon atoms substituted by at least one group selected from the group consisting of methacryloxy group, amino group, glycidoxy group and 3,4-epoxycyclohexyl group, and $Q^3$ is an alkyl group having 1 to 4 carbon atoms,
the molar ratio of Si derived from the component (a) to Si derived from the component (b) in the resin composition ($Si^a/Si^b$) is 2/8 to 4/6,
the (b-1)/(b-2)/(b-3) ratio of the above components being 80-100/0-20/0-20;
the component (c) is a curing catalyst;
the component (d) is a solvent; and
the component (e) is an acrylic copolymer comprising 50 to 90 mol % of a recurring unit represented by the following formula (A-1):

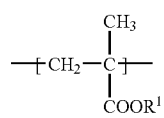

(A-1)

wherein $R^1$ is a methyl group or ethyl group,
and 10 to 50 mol % of a recurring unit represented by the following formula (A-4):

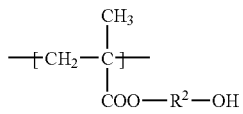

(A-4)

wherein $R^2$ is an alkylene group having 2 to 5 carbon atoms, in an amount of 0.1 to 20 parts by weight based on 100 parts by weight of the organosiloxane resin composition.

14. An organosiloxane resin composition comprising components (a) to (d), wherein
the component (a) is colloidal silica;
the component (b) is a hydrolysate(s) and/or condensate(s) of alkoxysilanes represented by the following formulas (b-1) to (b-3):

$Q^1Si(OQ^3)_3$ (b-1)

$Q^1Q^2Si(OQ^3)_2$ (b-2)

$Si(OQ^3)_4$ (b-3)

wherein $Q^1$ and $Q^2$ are each an alkyl group having 1 to 4 carbon atoms, vinyl group or alkyl group having 1 to 3 carbon atoms substituted by at least one group selected from the group consisting of methacryloxy group, amino group, glycidoxy group and 3,4-epoxycyclohexyl group, and $Q^3$ is an alkyl group having 1 to 4 carbon atoms,
the (b-1)/(b-2)/(b-3) ratio of the above components being 80-100/0-20/0-20;
the component (c) is a curing catalyst;
the component (d) is a solvent; and
the molar ratio of Si derived from the component (a) to Si derived from the component (b) in the resin composition ($Si^a/Si^b$) is 2/8 to 4/6,
wherein when the silicon nuclear magnetic resonance spectrum ($^{29}$Si-NMR) of the organosiloxane resin composition was measured using deuterium oxide ($D_2O$) as a measurement solvent at a measurement frequency of 79 MHz, a measurement pulse of 6.0 μs, a repetition time of 30 sec. and a broadening factor of 5 Hz, the chemical shifts of the silicon atoms of the organosiloxane resin composition satisfy the following expressions:

$0.002 \leq [X]/[S] \leq 0.2$ and $0.6 \leq [Y]/[Z] \leq 3$ wherein [S] is the integrated value of all the peaks at a range from −46.5 ppm to −70.0 ppm, [X] is the integrated value of all the peaks at a range from −46.5 ppm to −48.5 ppm, [Y] is the integrated value of all the peaks at a range from −52.5 ppm to −61.0 ppm, and [Z] is the integrated value of all the peaks at a range from −61.0 ppm to −70.0 ppm when the peak of the silicon atom of tetramethylsilane is at 0 ppm.

* * * * *